United States Patent [19]

Hopson

[11] 4,422,745
[45] Dec. 27, 1983

[54] CAMERA SYSTEM

[75] Inventor: Talmadge W. Hopson, Bloomington, Minn.

[73] Assignee: National School Studios, Inc., Minneapolis, Minn.

[21] Appl. No.: 288,815

[22] Filed: Jul. 31, 1981

[51] Int. Cl.³ ............................................. G03B 17/24
[52] U.S. Cl. .................................... 354/105; 354/109; 354/173; 354/213; 354/293; 235/462
[58] Field of Search ...................... 354/23 D, 105, 106, 354/109, 173, 211, 213, 293; 346/107 R; 235/462

[56] References Cited

U.S. PATENT DOCUMENTS

| | | | |
|---|---|---|---|
| 2,932,478 | 4/1960 | Krieger | 354/293 |
| 3,626,423 | 12/1971 | Ameen | 346/107 R |
| 3,783,763 | 1/1974 | Whitley et al. | 354/211 |
| 4,053,909 | 10/1977 | Shinoda et al. | 354/105 |
| 4,182,562 | 1/1980 | Iwashita et al. | 354/173 |
| 4,217,046 | 8/1980 | Weinstein et al. | 354/106 |
| 4,297,019 | 10/1981 | Yagi et al. | 354/213 |

Primary Examiner—Russell E. Adams
Attorney, Agent, or Firm—Kinney, Lange, Braddock, Westman & Fairbairn

[57] ABSTRACT

A microprocessor controlled camera system for exposing film with a photographic subject, a field of bar code data relevant to the subject and a field of data taken from a written card. The camera system includes an elevator assembly for raising and lowering the camera in response to a control actuator and a fixed aperture dual zoom lens system for framing the subject under control of the control actuator. A flash control system utilizes reflected light from the flashtube to indicate the amount of additional light needed on the subject and commands additional energy storage capacitors to be discharged through the flashtube to increase the subject illumination to a desired level.

20 Claims, 32 Drawing Figures

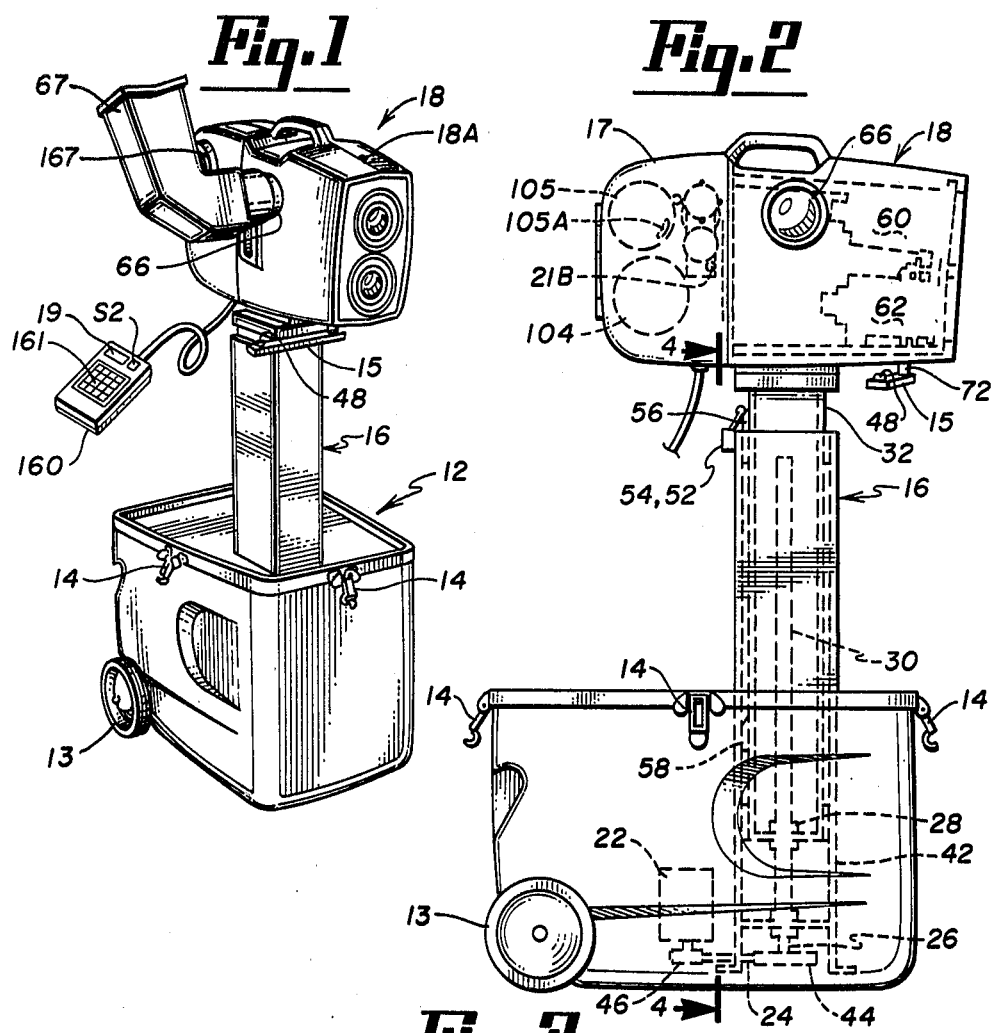

| FIG.19A | FIG.19B | FIG.19C | FIG.19D | FIG.19E |
|---|---|---|---|---|
| | FIG.19F | FIG.19G | FIG.19H | FIG.19I |
| | | FIG.19J | | |

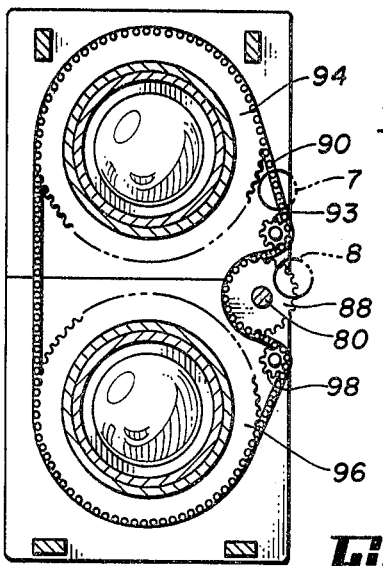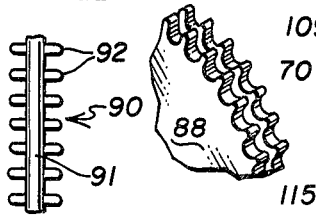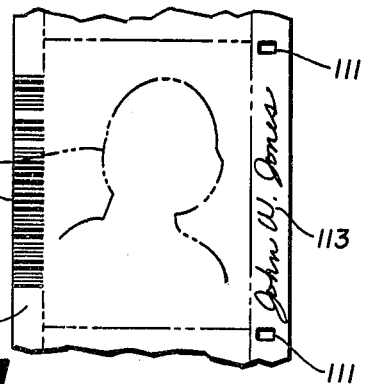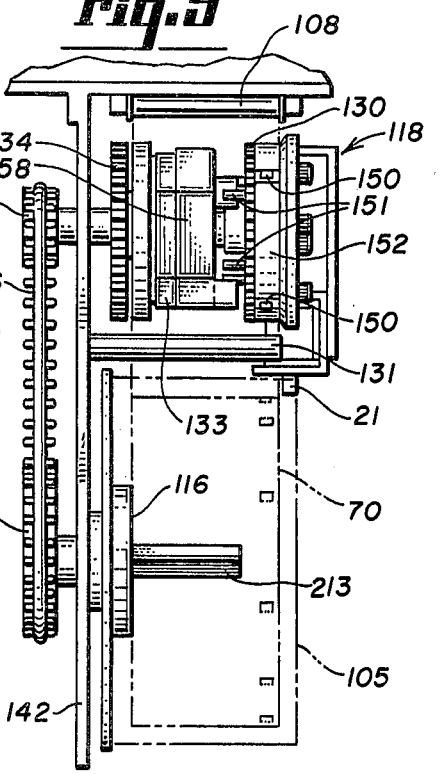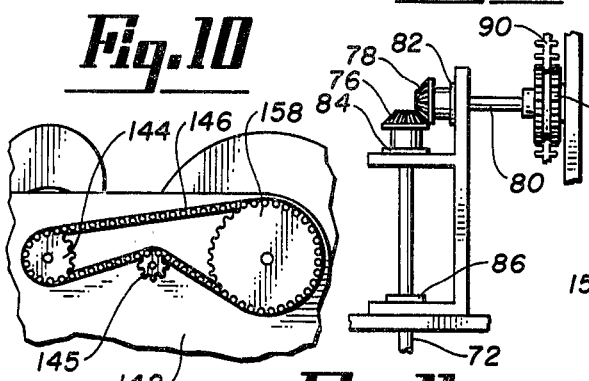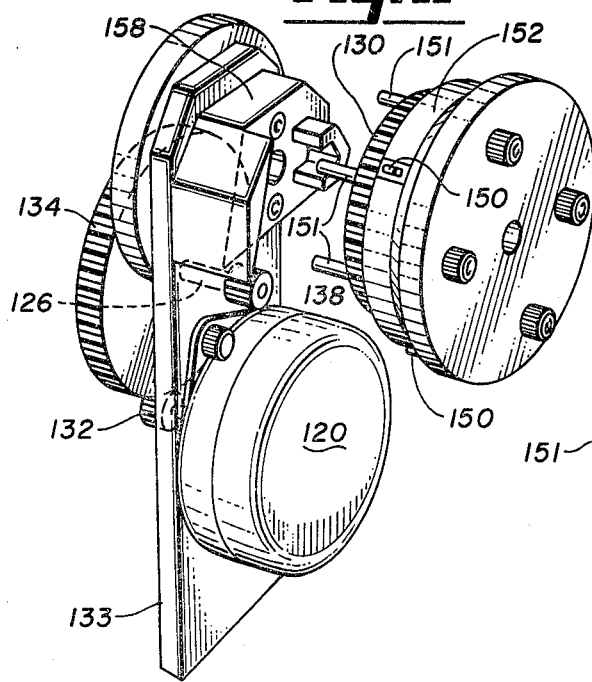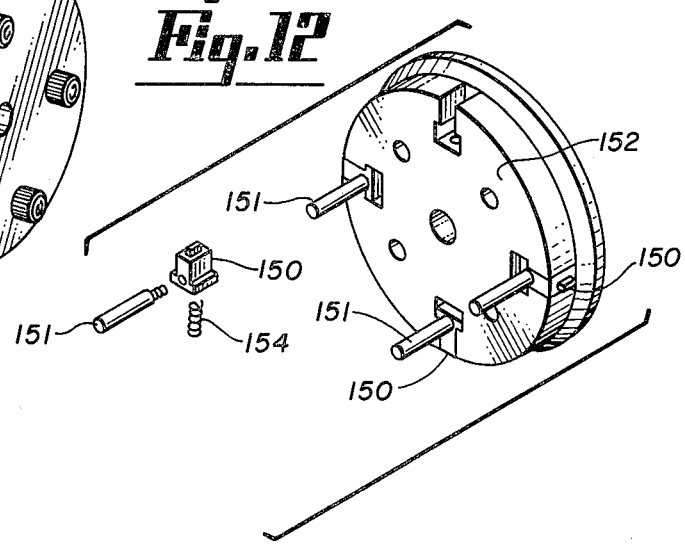

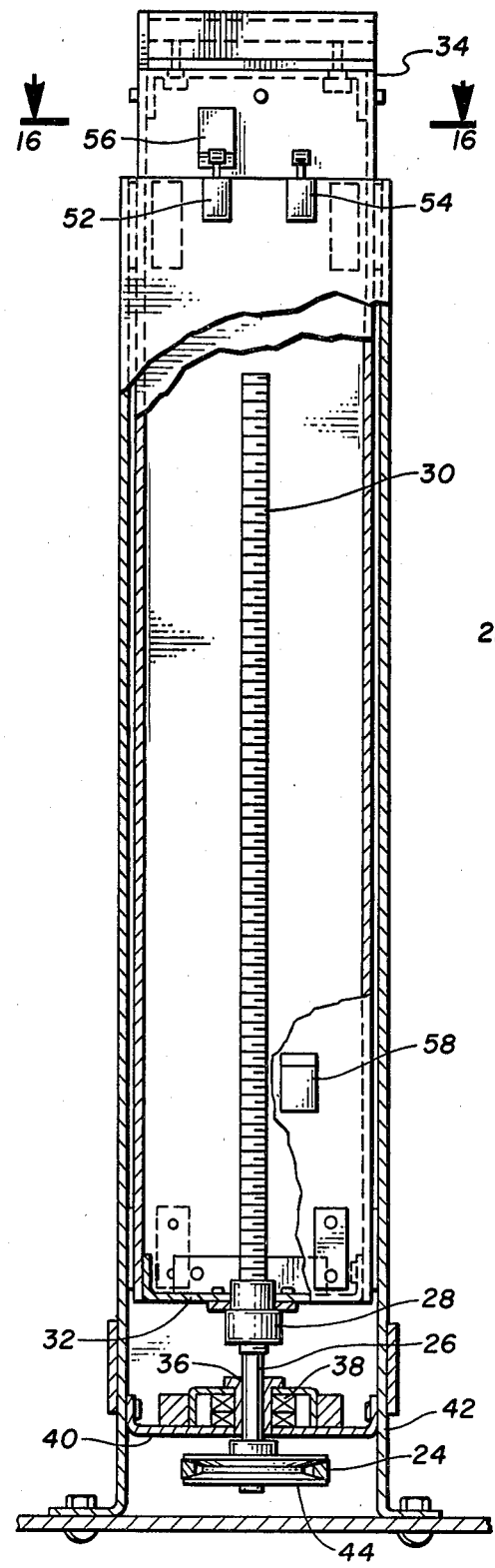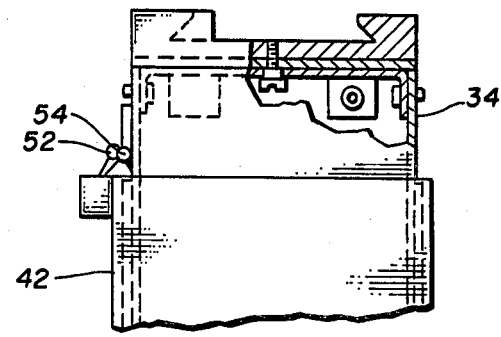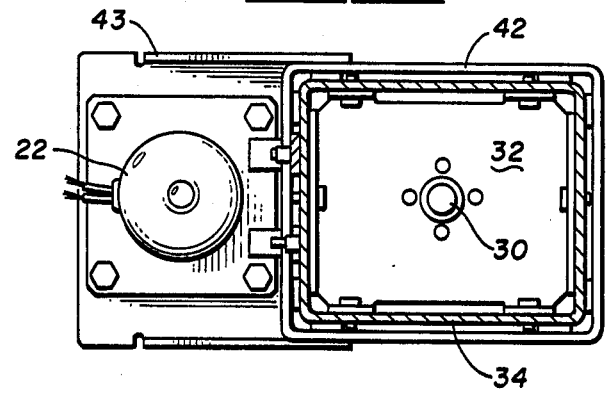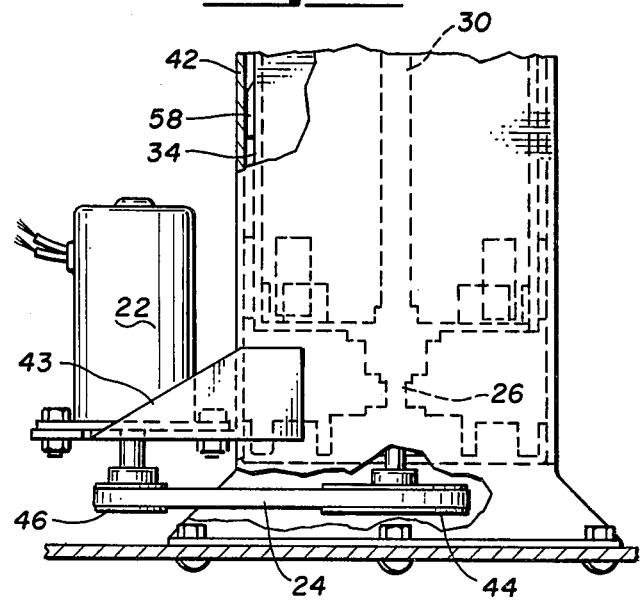

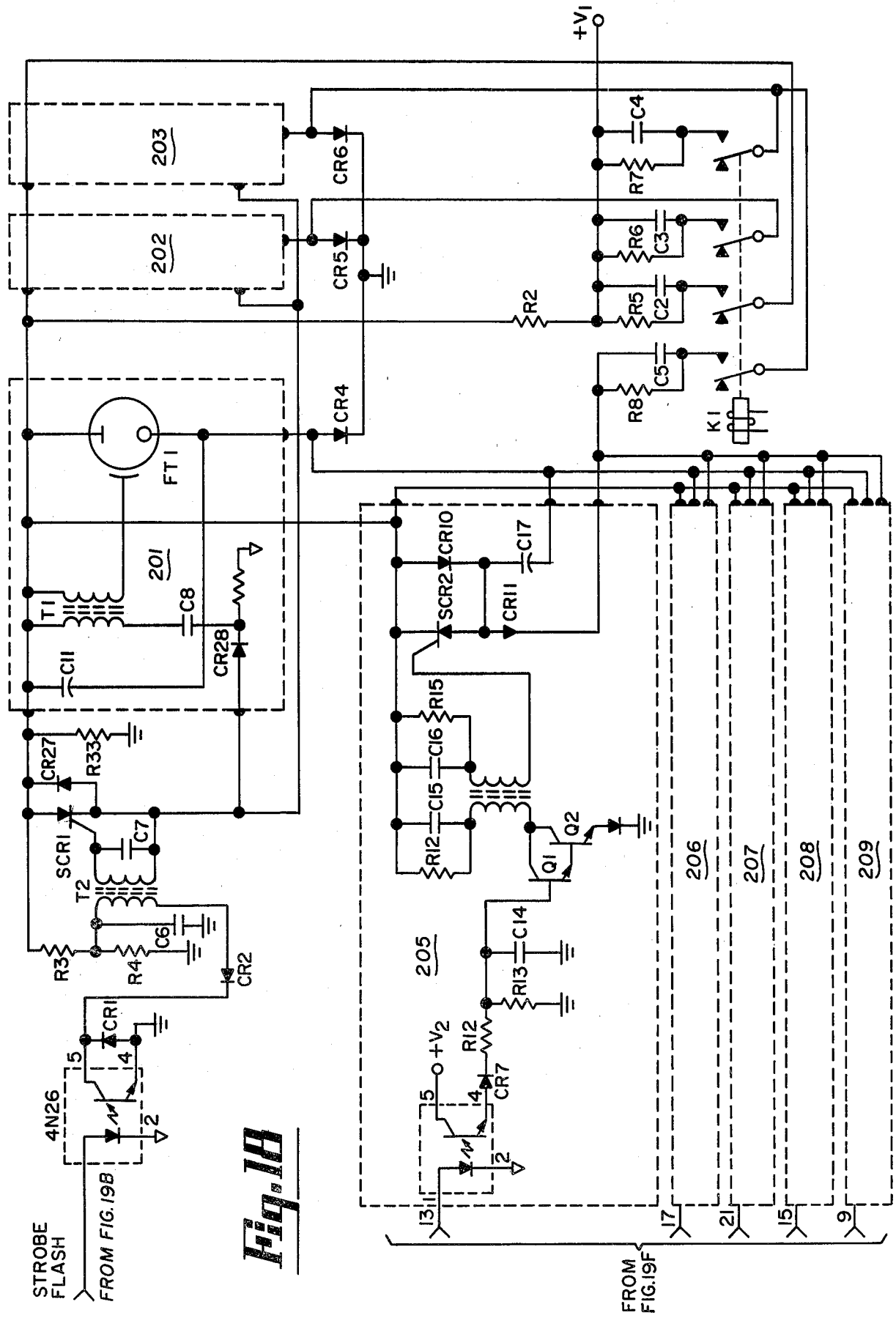

Fig.19A
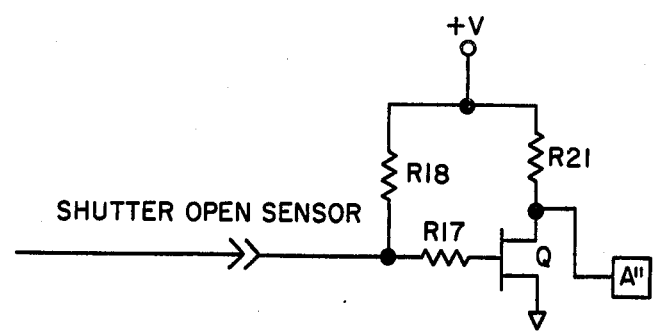
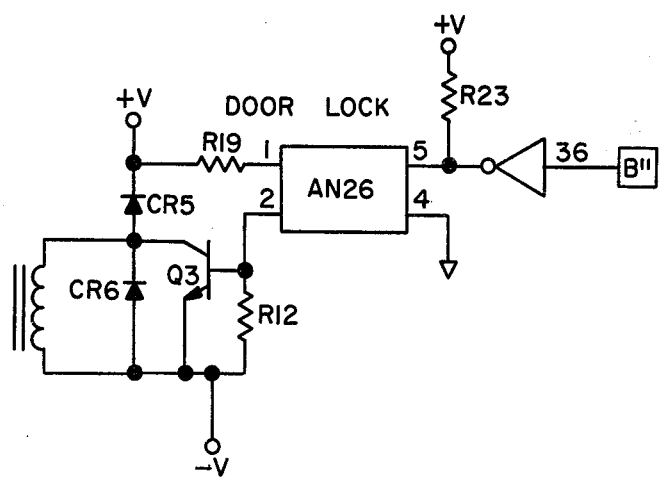

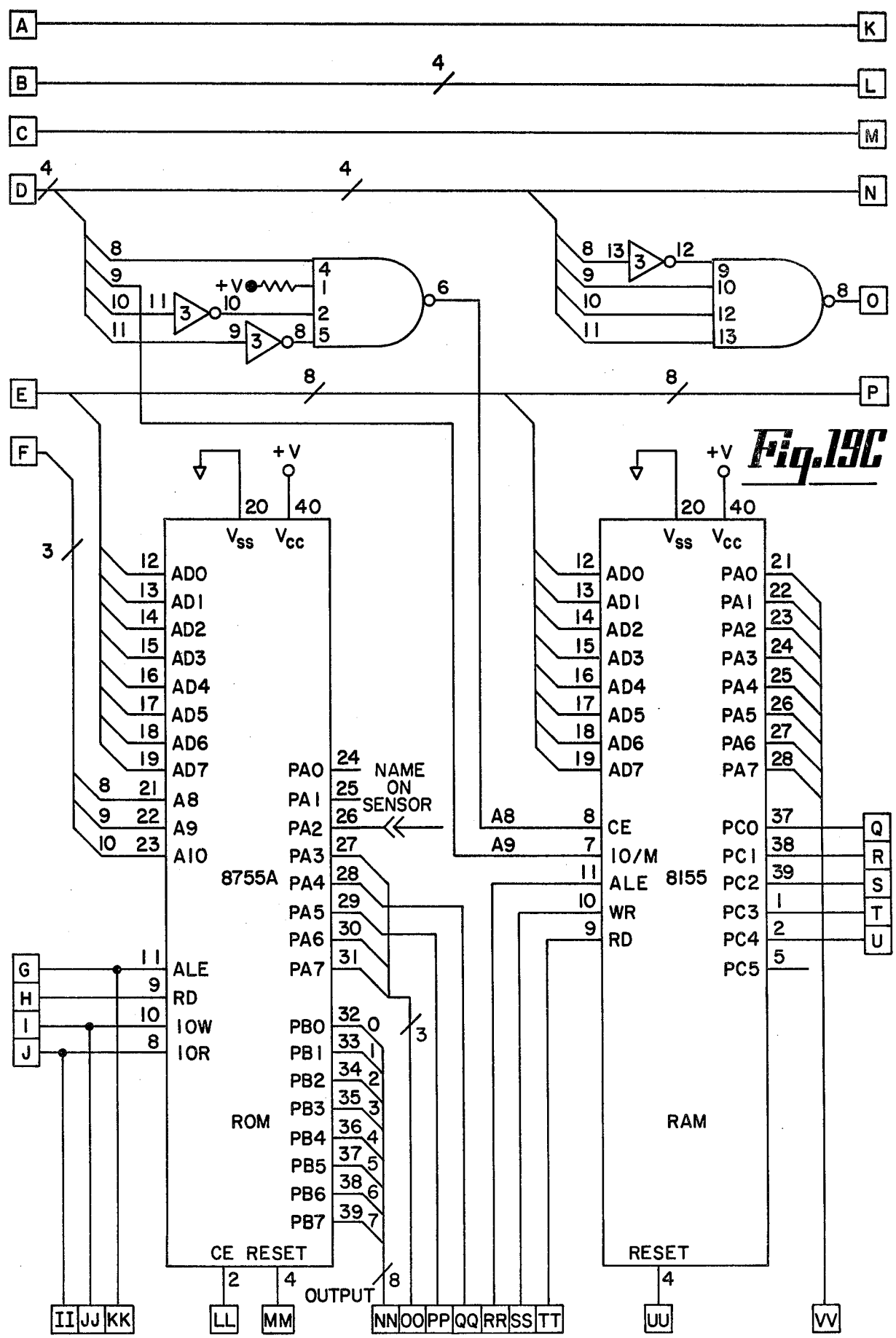

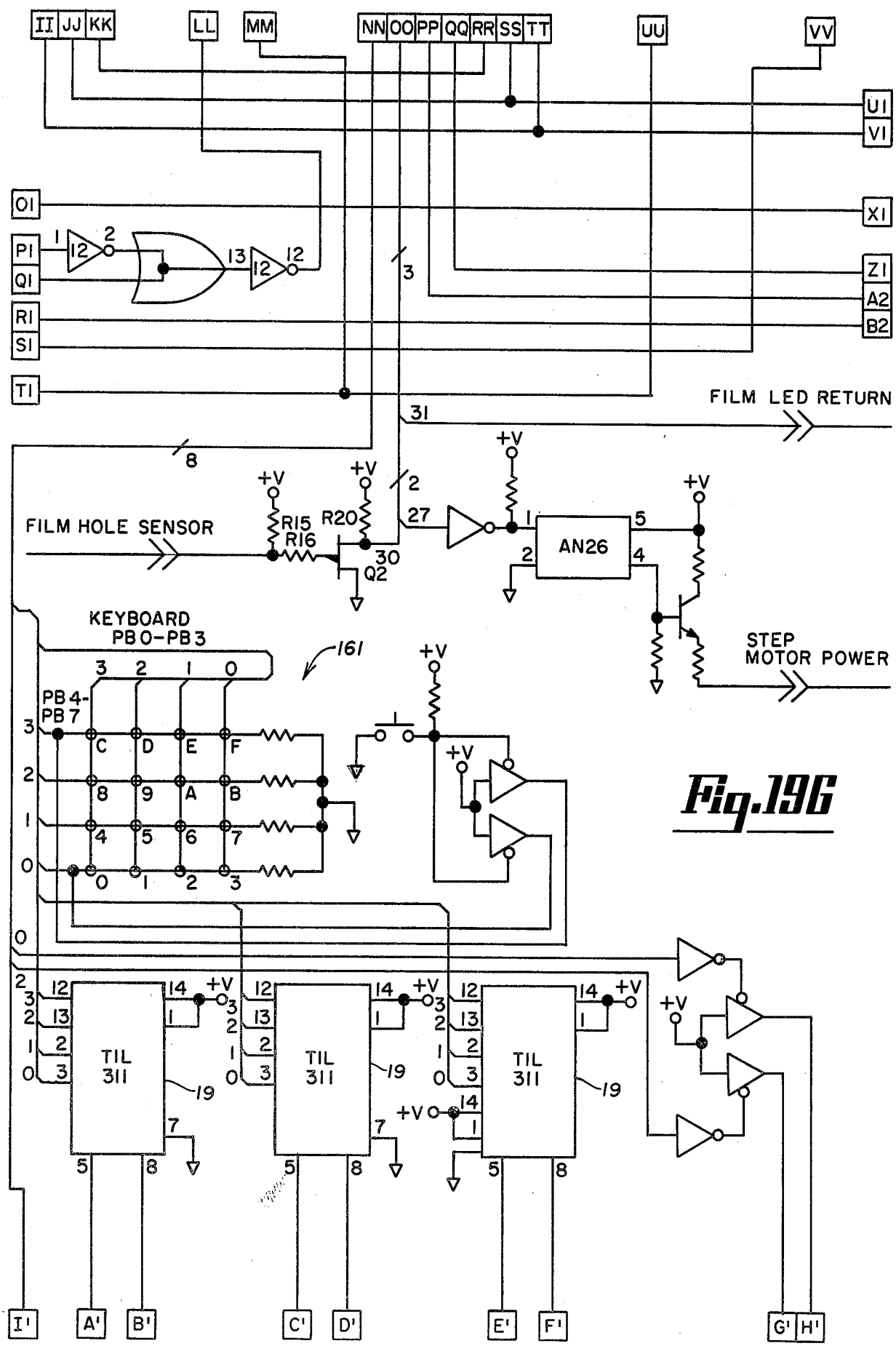

CAMERA SYSTEM

DESCRIPTION

This application also includes an appendix of computer program listings comprising 73 pages of computer printout.

BACKGROUND OF THE INVENTION

This invention relates to photographic apparatus operated under the control of electronic circuitry. Electronic circuitry controls operation of the camera, stores data concerning usage of the camera and controls the operation of the automatic electronic flash utilized with the camera.

In photographic systems, electronic circuitry has been utilized in the past to control or assist in the control of certain operating camera functions. Thus, for instance, specialized circuits have been developed for shutter control or for the control of the operation of an electronic flash unit. Such prior art systems have not significantly reduced the amount of labor required to photograph a large number of individual subjects, especially where a record must be made of the order information and other data.

In prior art camera systems, it is necessary to group subjects by order number before any photos are taken. Photos are then taken of an order board to identify the order information for a group of subjects within a class. Additional photos must be taken to record the identification of the class. In prior art cameras, it is also necessary to utilize space between photos to receive "name on" information, such as the signature or typed name of the subject.

The present invention is directed to an improved photographic system wherein substantially all of the camera operations are performed under control of electronic circuitry contained within the camera. To this end, the invention utilizes a camera which can be provided with film loaded in a supply cartridge. The camera is provided with means for placing a photographic image on the film and means for adding additional information to the film adjacent the photographic image. In the preferred embodiment shown, means are provided for adding bar code information on one data track of the film and written information obtained from a data card on another data track of the film, with both data tracks on opposite sides of the film image. Information concerning the utilization of the camera and the number of photographs taken under varying conditions is stored in memory for recall by the photographer. The control circuitry instructs the photographer as to the sequence of operations to be performed and provides display information indicating any malfunctions of the camera system or the failure of the operator to supply required information.

Use of the present camera substantially reduces the labor required of the photographer to record order, class identification, date, photographer identification and other data. As much as a 25% decrease in labor or increase in shooting speed can be accomplished over the prior art systems.

Use of wide format film with binary coded data tracks and "name on" data tracks on both sides of the photo image results in at least a 15% decrease in the amount of film used to shoot photos of a complete school class because the order information need not be photographed from boards, thereby wasting considerable film.

The provision of a rapidly adjustable dual zoom lens system and automatic flash control circuit eliminates the need for frequent f-stop adjustment of the need to group subjects by skin tone.

The primary object of the invention is to provide an improved camera system utilizing electronic circuitry to assist in the operation of the camera.

Another object of this invention is to provide a system including a control means for assuring that mechanical elements are properly operating before the camera shutter is actuated.

Still another object of this invention is to provide a camera utilizing a keyboard operated remote control for applying data to the camera logic circuitry to operate the camera.

A still further object of the invention is to provide a camera system having an improved automatic flash control system for inhibiting operation of the camera when the lighting level at which the automatic flash can be controlled and for utilizing the reflected light level sensed from the photographic subject when illuminated by a fixed flash to add incrementally to the energy discharged through the flashtube to provide a controlled optimal illumination of the flash subject.

An additional object of this invention is to provide a control system including means for placing coded digital information on the film in a bar code representation applied as the film is advanced on a step-by-step basis.

Yet another object of the invention is to provide a camera system including means for placing additional photographic images on the film obtained from a written data field on a "name on" control card.

A further object of the invention is to provide a camera system including means for receiving information from either a keyboard or a card reader and converting it within the camera to digital bar code information and applying it to the film.

A still further object of the invention is to provide a camera system including means for storing data on the number of exposures remaining on the film supply canister, the number of photographs taken in various data categories, such as photographic print order categories, and other information.

A further object of the invention is to provide a daylight loading camera utilizing a film take-up canister having a cut-off mechanism contained within the canister cover for cutting off the film and sealing the take-up canister whenever the camera door is opened under control of the operator.

A still further object of the invention is to provide a camera system utilizing a camera mount means for raising and lowering the camera under control of a control actuator.

A still further object of the invention is to provide a camera utilizing identical coupled zoom lenses for the viewing and camera lenses operated under control of a single control actuator.

The above and other objects of the invention are achieved by providing in the preferred embodiment of the invention a camera and control electronics for controlling the various operations of the camera in accordance with information stored in the control electronics.

BRIEF DESCRIPTION OF THE DRAWINGS

These and other objects and advantages of the present invention will become more apparent by referring to the following detailed description and accompanying drawings, in which:

FIG. 1 is a pictorial view in perspective of the camera and mounting base according to the present invention;

FIG. 2 is a right side elevation view of the camera and base with some internal details shown generally in hidden lines;

FIG. 3 is a pictorial view in perspective of the camera shown with the cover removed and with electrical wiring disconnected and other non-essential details shown in simplified form;

FIG. 5 is a rear sectional elevation view of the dual zoom lens rotational drive elements and associated framework taken along the lines 5—5 of FIG. 3;

FIG. 6 is a right side elevational detail of the right angle drive elements associated with the dual lens rotational drive;

FIG. 7 is a fragmentary view of a portion of the drive belt used in the drive train of the camera shown enlarged and taken at reference character 7 of FIG. 5;

FIG. 8 is a pictorial detail of part of a typical drive driven wheel shown enlarged and taken at reference character 8 of FIG. 5;

FIG. 9 is a top plan view of the film spindle drive assembly;

FIG. 10 is a left side elevation view of the spindle drive assembly shown in FIG. 9 illustrating the belt drive elements;

FIG. 11 is a pictorial view in perspective of the film drive assembly with the film advance moved away from the film advance cam along their centerline axes to illustrate the cam and follower elements more clearly;

FIG. 12 is an exploded isometric view of elements of the film advance mechanism;

FIG. 13 is a pictorial view of a typical frame of developed film;

FIG. 14 is a rear sectional view of the camera mounting mechanism and elevator with parts broken away and with the camera body removed;

FIG. 15 is a right side elevation view of the upper end of the camera elevation mechanism with parts broken away;

FIG. 16 is a top plan sectional view of the elevator taken along line 16—16 of FIG. 14;

FIG. 17 is a right side elevation view of the lower end of the camera elevator with parts broken away;

FIG. 18 is a schematic of the photoflash circuitry; and

DESCRIPTION OF THE PREFERRED EMBODIMENT

Short Description of Operations Performed

Figure 4:
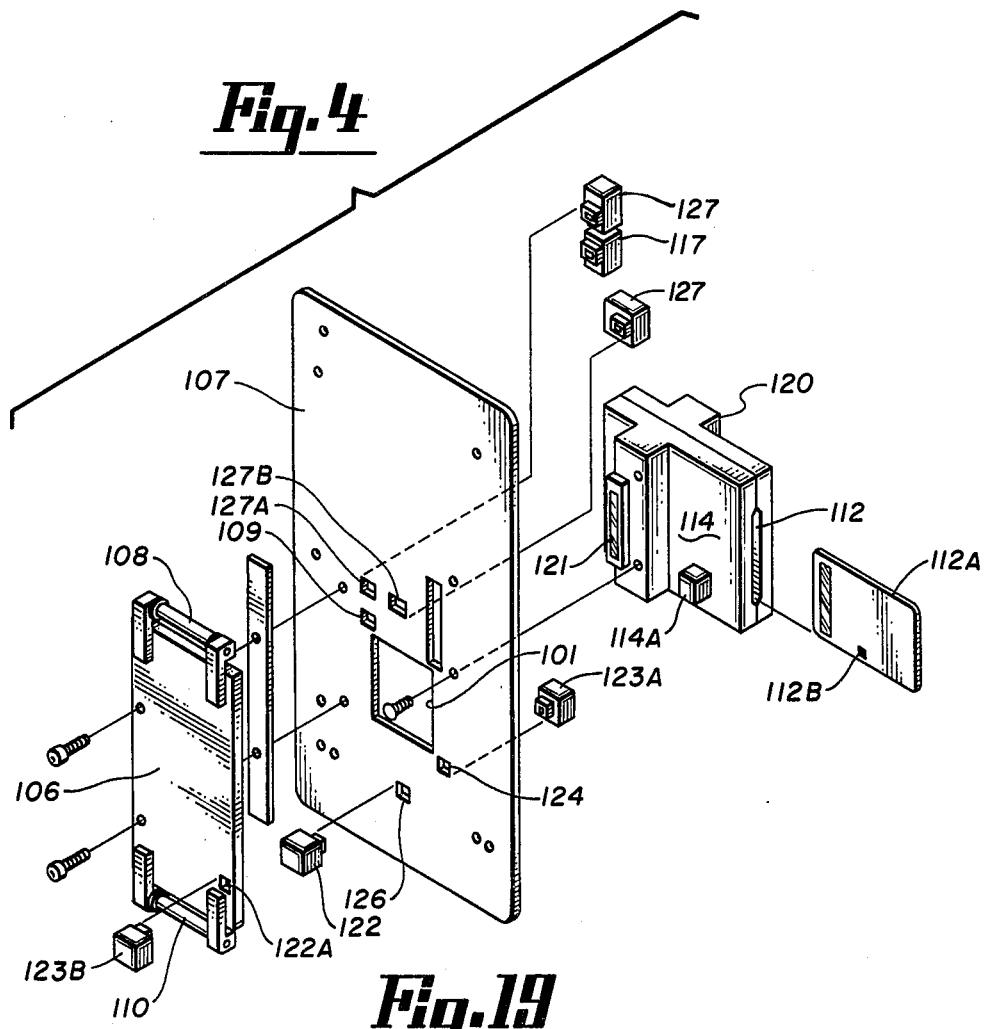
FIG. 4 is a simplified exploded view showing the layout of the component mounting plate and the various sensors and other electronic components.

The camera disclosed herein operates under the control of an operator or photographer and includes control circuitry for performing a number of operations without operator intervention. The basic camera 18, as shown in FIG. 1, is operated by a remote hand control 160 which includes a 16-key data entry keyboard 161 (keys 0 through 9 and A through F), a shutter trip command switch $S_2$ and a three-digit digital display 19.

Figure 21:
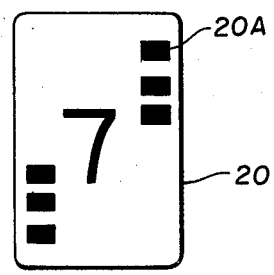
FIG. 21 shows a typical customer order card.

Name on cards 112A, such as the one shown in FIG. 4, and customer order cards 20, such as the one shown in FIG. 21, are used to supply additional information to the camera. In the preferred embodiment, the name on card is used to insert the written or typed name of the photographic subject in the name on field 113 of the film (see FIG. 13) when the camera is operated in the name on mode. The name on field information is recorded at the end of the film advance.

Customer order card 20 may be inserted into a card reader (not shown) which is remote from the camera. In the preferred embodiment, one or two customer order cards are used to provide information concerning the customer's order of prints. In the preferred embodiment, a customer order must be entered either through the card reader or the keyboard in order to enable the shutter trip.

The control electronics of the camera, as described more fully below, receives operation codes from keyboard 160 and recognizes that as a request to perform specific tasks. The three digits are followed by a zero to form a complete command. The three digits are displayed on the display 19 and executed when the zero key is depressed. If an error is made in the command entry, repetitious "F"s are entered until display 19 reads all zeros.

The camera also provides a series of warnings to the operator which may be accompanied by a flashing display, as shown in the preferred embodiment, or, alternatively, by a series of audible beeps. The warnings are listed in Table 1:

TABLE 1

| Display Reads | Description |
| --- | --- |
| OOF | Out of Film |
| BFA | Bad Film Advance |
| ECO | Enter Customer Order (operator did not enter order information) |
| BAI | Bad Area Illumination (room light level is too high for proper flash operation) |
| SSC | Shutter Stuck Closed (shutter stuck, or flash inoperative, or backdrop improper) |
| SSO | Shutter Stuck Open |

The camera requests data from the operator by displaying certain codes in non-flashing form. These codes are listed in Table 2:

TABLE 2

| Display Reads | Date Requested |
| --- | --- |
| EID | Enter Operator I. D. |
| ECC | Enter Class Code |

The operator I.D. is an alpha-numeric identification assigned to the operator which is stored in memory and applied to each photo in a bar code form. The class code is an alpha-numeric designation of the particular school classroom of students whose photos are being taken. This data also is coded on each photo, together with the calender day the picture was taken, the roll and frame number and the package print selection.

The camera includes several keyboard selected operational modes. As indicated above, the customer order is entered either from the keyboard or from a card reader. Keyboard entry is commanded by the code 108 followed by a zero. Card reader data entry is commanded by code 109 followed by a zero. The code 110, followed by a zero is a query for the camera to indicate on the display which mode was selected. A response of CCC indicates card entry was selected, while BBB indicates keyboard.

Data stored in camera memory can also be retrieved. The display 19 will indicate the number of frames shot when the command 111, followed by a zero, is applied. The number of each package shot is called for by entry of code 102 followed by a zero. The total number of each unit shot is displayed following entry of its digit. Entry of the F-key will display the number of F packs and cause an exit to the subroutine.

The roll number is also stored in the camera. Each time the roll is changed in any given calendar day, the roll number is advanced without operator intervention. The roll number counter is reset to zero at midnight. The roll number is displayed in response to code 116 followed by a zero.

After operation of the reset button, the display will indicate "EID" to alert the operator to enter his I.D. number. The I.D. number is displayed in response to command 115 followed by a zero.

After each reset operation, the I.D. is requested. After entry of the I.D., the class code is requested by the ECC indication on the display. The class code is changed by entry of code 106 followed by zero. After that command, a new class code is accepted. If more than 25 shots are made without a change of class code, the display 19 will flash a 000 display after each shot. The display is merely a reminder and does not inhibit further shooting.

In the event that the operator detects closed eyes or movement of the subject during strobe flash, the shot may be cancelled by entry of a code 103 followed by zero. The image and bar code data on that frame are obliterated and data relating to that shot are obliterated as described below.

The flash circuits may be tested by entering the code 104 followed by zero to obtain a firing of the flash through the control logic without opening the shutter or advancing film.

FIG. 1 shows in perspective view the camera system 10 according to the present invention. Camera 18 is mounted on a movable base unit 12 which includes wheels 13 to facilitate movement and clamps 14 which mate with corresponding hardware on an interfitting protective cover unit which is not shown. The cover unit may include a slot housing the sensor and electronics shown in FIG. 19B for reading the customer order card information.

The camera 18 may be raised and lowered from the base 12 utilizing a control stick 15 to actuate an elevation mechanism contained within support column 16. The base 12 is used for transporting capacitors used in the camera electronic flash system as well as the necessary power cords and other accessories utilized in the overall camera system.

Although the preferred embodiment shown is a camera specifically intended for use in taking repetitive portraits in a high volume operation, such as a school, it will be realized that many of the features of the camera have broad applicability in a number of camera systems for other uses. For example, the unique bar code generating circuitry embodied in the camera can be utilized to generate bar codes in a variety of other photographic and even nonphotographic applications. The electronic flash and other control circuitry embodied in the present invention also has utility over a broad range of camera systems beyond the specific embodiment shown.

Camera Elevation Mechanism

The camera elevation mechanism is shown in simplified elevation view in FIG. 2 with the internal parts shown in phantom and in additional detail in FIGS. 14 through 17. Turning now to FIGS. 2 and 17, the basic parts of the elevation mechanism are shown. A drive motor 22 drives a belt 24 which, in turn, drives a shaft 26 which is used to raise and lower the camera 18 by a worm gear arrangement 28 shown in more detail in FIG. 14.

The shaft 26 has an extended portion 30 which is screw threaded to mesh with the ball bearing nut portion 28 which is, in turn, mounted on member 32 which closes the base of the inner beam portion 34.

Shaft 26 is supported by bearings 36 mounted in a bearing block 38 which is, in turn, attached to a bracket assembly 40 attached to the pedestal base 42. Pulley 44 is attached to shaft 26 and is coupled via the belt 24 to pulley 46 mounted on the shaft of motor 22. Motor 22 is mounted securely to a projection 43 of the pedestal base 42. The camera is raised and lowered by driving motor 22 to rotate the shaft 26 and screw 30 to move the ball bearing nut 28 along the shaft 26 to, in turn, raise and lower the inner shaft portion 34. The actuation of the motor is accomplished by pressing a momentary contact switch 48 located on top of the control stick 15 to raise the camera 18 and a similar momentary contact switch on the bottom of the control stick to lower the camera. The bearing surface between the inner portion 34 and the outer housing 42 is formed by the strips 50 shown in FIG. 14.

A pair of limit switches 52 and 54 are mounted at the top of the lower support. Limit switch actuation plates 56 and 58 cooperate with switches 52 and 54, respectively, to signal the fully-retracted and fully-extended conditions of the pedestal, respectively. The electronic circuitry with which the limit switches 52 and 54 and the control switches 48 cooperate to raise and lower the pedestal is conventional and not specifically shown.

The top of the inner member 34 has a dovetail mounting block 59 attached to it to receive the base of the camera assembly.

COUPLED LENS SYSTEM

The camera includes a coupled zoom lens system which can be seen most clearly in FIG. 3. The camera employs a pair of lens assemblies 60 and 62 as the viewing and camera optics, respectively. The image from the viewing lens is projected onto a mirror 64 which can be viewed directly or through a viewing port 66 in the camera case through a suitable viewing hood 67 as shown in FIG. 1. Mirror 64 has an aperture in its reflective backing at the center of the image. A phototransistor sensor 69 is bonded to mirror 64 at that point to receive light and provide a flash and room light sensing signal to the control logic, as discussed in more detail below.

Figure 19:
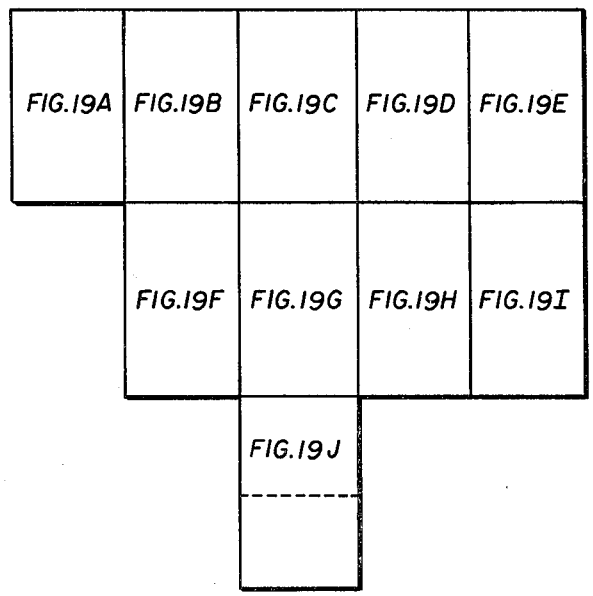
FIG. 19 shows the orientation of FIGS. 19A through 19H which are a detailed schematic of the electronic circuitry of the camera.
Figure 19B:
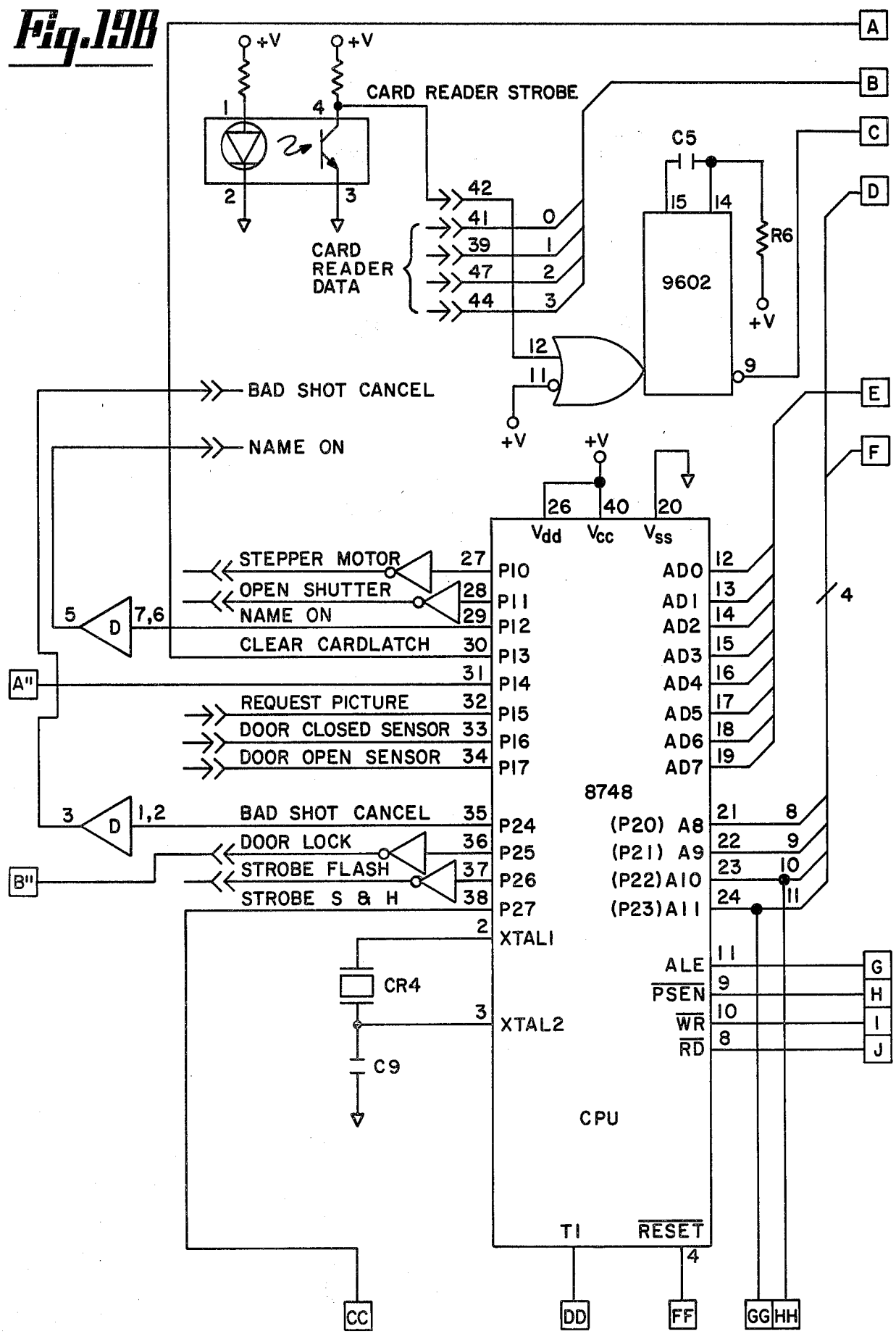
Figure 19D:
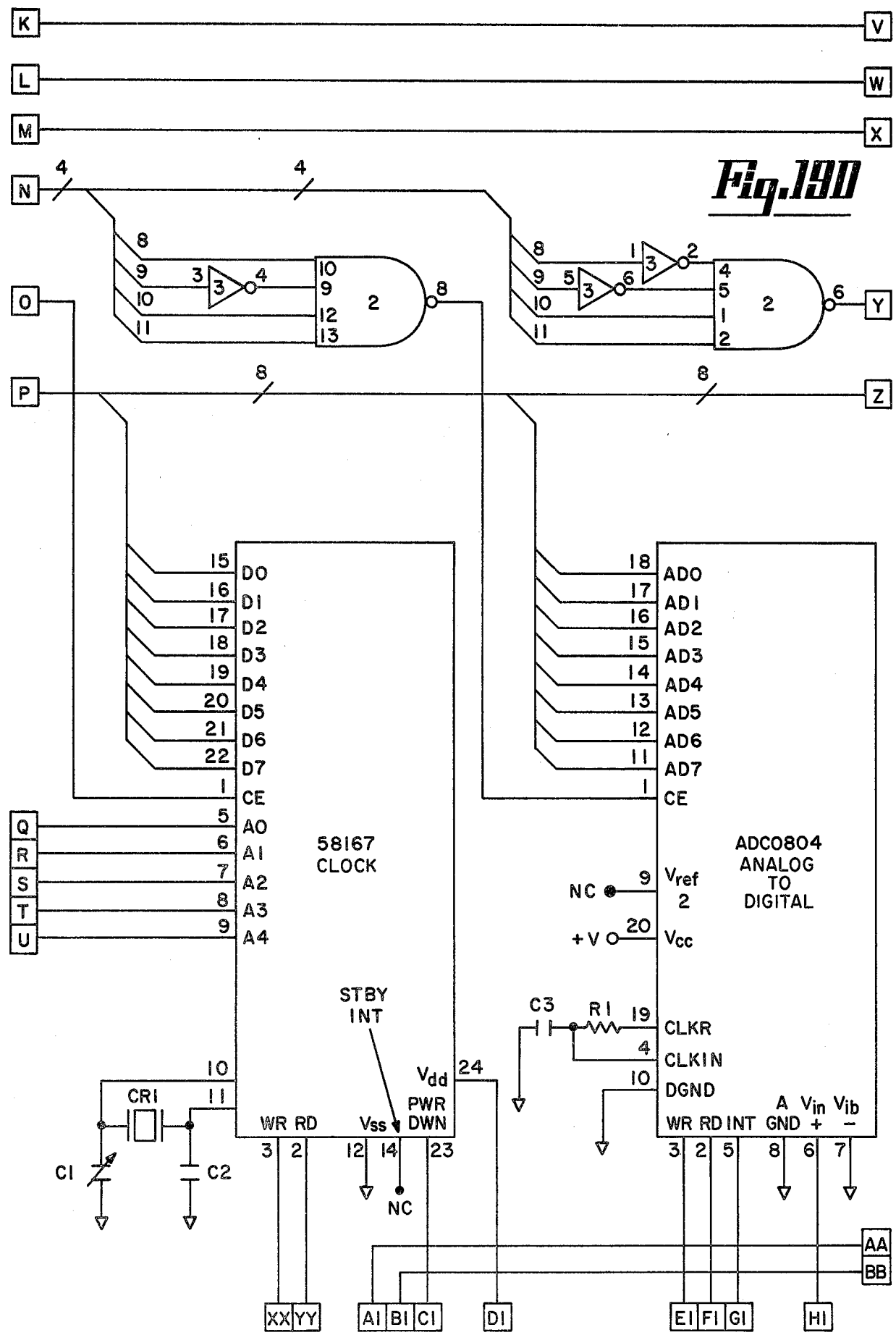

The image from the camera lens 62 is projected onto the film 70 when the solenoid 71 of electromechanical shutter 72 is actuated by the "open shutter" command at pin 28 of the CPU shown in FIG. 19B. Both lens assemblies 60 and 62 are zoom lenses having, in the preferred embodiment shown, focal lengths between 110 and 150 millimeters. Both are adjusted in the preferred embodiment shown to operate a fixed distance of 55 inches from the subject. Adjustment of the lenses by operator manipulation of control actuator 15 results in enlargement or reduction of the subject image on the film while the image remains in sharp focus. Thus, the operator has adjustable control to allow him to compensate for individuals of varying size, seated at a fixed distance.

Figure 20:
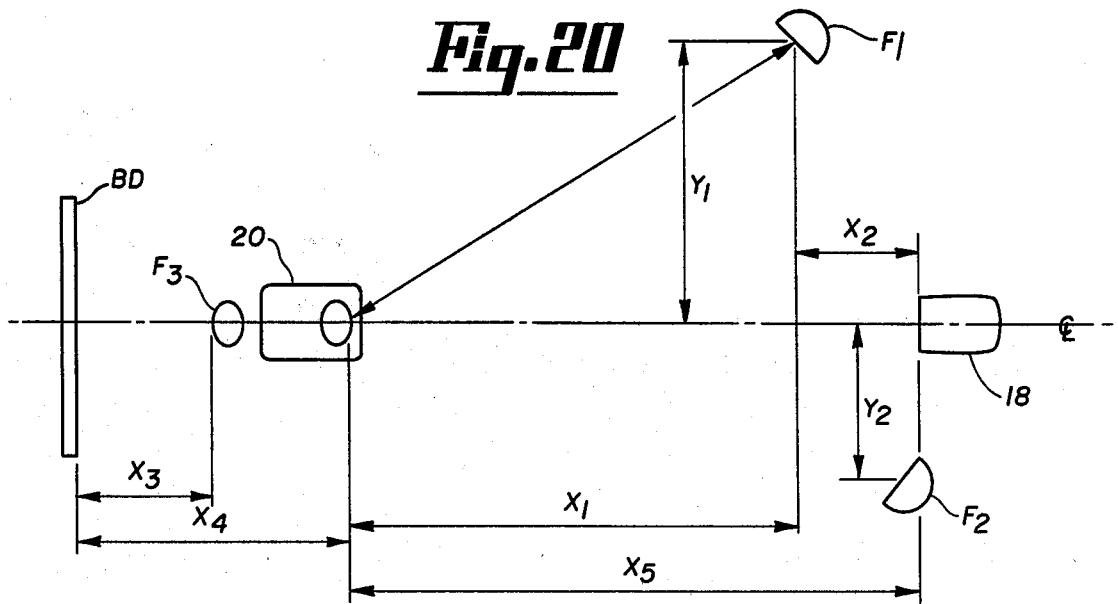
FIG. 20 is the floor plan for the set up of the camera and its associated flash units.

FIG. 20 shows the camera 18 and main light F1, fill light F2 and backdrop light F3, together with their distances from the subject. A backdrop screen BD is placed behind the subject. The seat 11 is the cover of the base unit 12 and may also contain the card reader for reading the customer order cards 20. In the preferred embodiment shown, the automatic flash sensing circuits of the camera are dependent on the components being located as shown in FIG. 19. In the preferred embodiment, $X_1=46''$; $X_2=9''$; $X_3=30''$; $X_4=48''$; $Y_1=39''$; $Y_2=16''$.

In the camera, two lenses are used for viewing and photographing because, in normal operation, the camera lens 62 is set at f16. Use of a typical reflex viewing arrangement would not provide sufficient light for adequate viewing with the lens stopped at f16. Use of the coupled identical lenses stopped at f16 for photographs and f3.4 for viewing provides adequate viewing light for the photographer under normal lighting conditions. The coupling system shown links the two lens assemblies mechanically so that they zoom in and out in response to operator manipulation of the control lever 15 to provide a view finder image identical to the film image.

Only the center portion (35×46 mm) of the lens image of each lens is actually utilized in the camera. The full image of the lenses is about 4"×5".

The control of the zoom lens is accomplished using control handle 15 which is rotatable about the axis of shaft 73 to drive a right angle shaft 74 through miter gears 76 and 78, as shown more clearly in FIG. 6. The shaft 80 attached to gear 78 is appropriately supported by a bearing 82, while shaft 73 is supported by bearings 84 and 86. Shaft 80 has a sprocket 88 attached to one end thereof. That sprocket, as shown in FIG. 8, includes two toothed portions with a central space therebetween to accept the non-slip drive belt 90 shown in FIG. 7. The drive belt has a number of projecting teeth 92 which project from its central portion 91. Central portion 91 of drive belt 90 passes through the space between the two disk portions of the sprocket 88, while the tooth portions 92 engage the sprockets on both sides of the space. Drive belt 90 follows a path over sprocket 88, idler sprocket 93, around the annular sprocket 94 of the viewing lens assembly 60 around the annular sprocket 96 of the camera lens assembly 62, around further idler sprocket 98 and back to the drive sprocket 88. The gear ratios of the sprocket 88 to the sprockets 94 and 96, as well as the internal gearing of the lens assemblies 60 and 62, are selected in the preferred embodiment to permit the photographer, when operating a predetermined distance from the subject to control the size of the image of the subject to appropriately fill the film space independently of the size of the portrait subject. Rotation of the control handle 15 through approximately 180° will move the zoom lenses 60 and 62 through their operating range.

A standard electromechanical shutter assembly 72 with a solenoid 71 is mounted on the rear portion of the camera lens assembly 62. The shutter is controlled by the control circuitry discussed below under the heading Camera Control System. Suitable shutter assemblies are manufactured by Uniblitz.

FILM TRANSPORT MECHANISM

The film is normally carried by a supply canister 102 shown in phantom outline on a supply shaft 103 which includes, at its base, a supply canister locater cam 104 having a shape which can be mated with the supply canister to assure its proper positioning. The take-up canister 105 includes a cutting edge 105A actuated when the door is opened to cut off the film under command of the control electronics prior to opening of the camera door. The film is cut off and rolled into the take-up canister 105 which is then sealed to permit daylight loading and unloading of the camera.

The film 70 is fed between a drive plate 106 and a component mounting plate 107. The film is passed over rollers 108 and 110 at the bottom and top of drive plate 106, respectively, to facilitate the transport of the film.

In the preferred embodiment shown, the film 70 is 46 millimeter film to accommodate the addition of a data track of written material relating to photographs taken, as well as a data track of bar code information. The photo image is 35 mm wide.

A piece of the film is shown in developed form in FIG. 13 to illustrate the format. The actual picture area 109 in the center of the film has 35 millimeter width with a 5-millimeter wide bar code track and a 6-millimeter wide track for written information. The film sprocket holes 111 are spaced on 46 millimeter centers to provide a picture area which is 46 millimeters long and to avoid interruption of the written information field 113 which can be utilized to record the name of the person being photographed or other similar information. A digital or bar code data track 115 is shown on the other side of the portrait area 109.

FIG. 4 shows the component mounting plate 107 and some of the important sensors and other components in exploded form. The photo aperture 101 is sized to form the 46 mm×35 mm photo image on film 70. A further aperture 109 is positioned above and to one side of photo aperture 101 to provide for the projecting of bar code information onto track 115 on the unsprocketed side of the film. The bar codes are formed by a bar code generator 117 which uses fiber optics elements 119 to conduct light from a light emitting diode matrix inside of the generator to form bar code bars on a step-by-step basis as the film is stepped past the generator.

Figure 22:
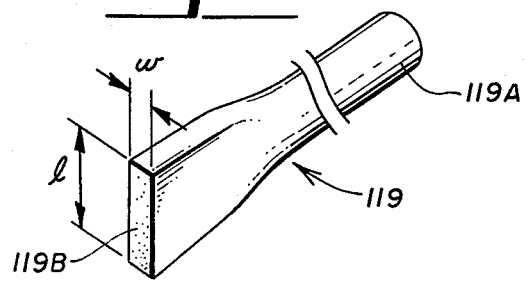
FIG. 22 shows a schematic of one of the fiber optic elements in the bar code generator.

One fiber optic element of the generator 117 is shown in schematic form in FIG. 22. The narrow end 118A of the fiber optics element 119 is connected to receive the light output of its associated LED in the array shown in FIG. 19F of the control electronics. There is one such fiber optic element for each LED. Masking (not shown) is provided to prevent light from one LED to couple into the fiber optic element 119 associated with another LED. The other end 119B of each fiber optic element 118B has a length 1 corresponding to the width of the 5 mm data track 115. The width of the end 119B is selected to correspond to the width of the narrowest bar code bar.

Using this arrangement, a bar code based on 12 bits can be generated. Since the CPU used in FIG. 19B is an 8-bit processor, the LED array is multiplexed in two, six-LED arrays. The first six LEDs have their cathodes connected in common to bit position 8 and the other six have their cathodes connected in common to bit position 7. The anodes are connected to bits 1 to 6. Thus, bits 7 and 8 select the sub-array to be energized, while 1 to 6 select the particular diode in the sub-array to form the bar code.

The bar code is formed of "narrow" and "wide" bars and spaces in a standard code known as Pitney Bowes Code 39. The coded matrix of LEDs may be energized to form a character at each of the eighteen 0.1006 inch steps that the film advance requires between photos.

Written information can be placed on the data track 113 on the other side on the photo image area 109 on the film. The written information, such as the subject's signature, is written on a translucent area 112B of a card which is inserted into the aperture 112 of the "name on" module 114. The written material is illuminated by an array of light emitting diodes located at 120 in the module 114 and the image of the signature is projected through aperture 121 onto the film after it is advanced for taking a photo of the subject. The presence of the "name on" card 112A in module 114 is sensed by reading the coded portion 112B of the card by an LED and phototransistor sensor 114A which provides its output to one of the ports in the ROM in FIG. 19C at pin 26.

The movement of the film 70 is controlled by the control electronics and by sensing the sprocket holes 111 on the side of film 70. A sensor 122 is located on the back plate 106 at aperture 122A and the associated light source 123A is positioned on the component plate 107 in aperture 124. The cooperation of the sprocket hole sensor 122 and the control electronics is discussed below in connection with the operation of the control electronics.

A "shutter-open" sensor 123 is positioned behind aperture 126 to receive light and provide an output when the shutter 100 is opened.

A "bad shot cancel" unit 127 is mounted on plate 107 in apertures 127A and 127B to partially obliterate both the photo image and the bar code information under control of the control electronics in the event the operator decides that the previous photo taken is inadequate. The unit is comprised of a light emitting diode and fiber optics to direct light from the diode film.

The film is wound on a take-up reel 105, shown in phantom form in FIG. 3, which is mounted on a take-up shaft 213 which drives a spool located within the take-up reel assembly 112. A take-up locater cam 116 is utilized to facilitate the proper positioning of the take-up canister 122 on the camera. Film 70 is passed over a roller 131 before reaching the take-up canister 122.

A film advance cam or metering wheel assembly 118 is used to drive the film under the control of a motor 120. The drive arrangement is shown in more detail in FIGS. 9 through 12. The motor 120 is mounted on a plate 133 with its shaft projecting therethrough to drive a gear 132 which, in turn, drives a larger gear 134 mounted on a shaft 136 projecting back through plate 133 to drive a further gear 138. The small gear 138 drives a larger gear 130 which is a part of the film advance cam assembly 118.

The shaft 136 also projects through mounting plate 142. A gear 144 is mounted thereon to drive a belt 146 which passes over an idler gear 145 and drives a gear 150 mounted on the other end of the take-up shaft 213 to drive the take-up shaft.

Because of the extremely wide spacing, 46 millimeters, of the sprocket holes in the film used in the preferred embodiment, it is necessary to make special provision for the engagement and disengagement of the drive sprocket cogs from the film holes as the film advance mechanism is rotated. In other words, difficulties would be encountered with the engagement and disengagement of the teeth on the sprocket with the sprocket hole because of the small radius of the sprocket in comparison to the spacing of the sprocket holes. FIG. 12 shows in exploded form the details of the arrangement used to retract the sprocket teeth 150 in accordance with a cam surface to allow the film to move from the sprocket to the take-up reel without damage to the sprocket holes from the sprocket in the film.

The film advance assembly 118 includes a film advance disk 152 which has apertures in its circumference to receive retractable film advance pins or teeth 150. Each film advance pin has a cam pin 156 projecting outwardly therefrom perpendicular to the face of the film advance disk 152. The pin 150 is urged into an extended position by a compression spring 154 and the cam surface. When the film advance disk is properly positioned in the assembly 118, the cam pins 151 engage the inside surface of film advance cam 158 to force the film advance pins 151 to retract within the circumference of the disk 152 to disengage the pins 150 from the sprocket holes of the film 70 as the film leaves the surface of the advance cam assembly 118 to move to roller 131. The spacing of the pins is such that two sprocket holes are engaged at all times.

FILM CHANGING AND LOADING

Film may be loaded in daylight because a sealed canister system is employed. To protect the film, the opening of camera door 17 is controlled by the logic circuit. After the camera is set up and the I.D. and class code are entered, the code 105 followed by zero is entered to advance film. If there is no film, the camera will so indicate by displaying OOF. If there is film, the display will indicate 000. The number of shots remaining may be displayed by entering code 101 followed by zero. The response is the number of shots remaining in the supply canister.

The door 17 is opened by entering code 114 followed by zero. The door lock solenoid 21 is actuated by the circuitry shown in FIG. 19A in response to the output at terminal 36 of the CPU in FIG. 19B. When solenoid 21 is actuated, the pawl 21B is released and door 17 swings open along the path marked 17A in FIG. 3. In FIG. 3, only a fragment of door 17 is shown.

The supply canister is loaded on spindle 103 and aligned with locater cam 104. The film is passed over guide roller 110, backing plate 106, guide roller 108, metering wheel 118, under roller 131 and into take-up canister 105. After the film is fed through and care has been taken to properly engage the sprockets on metering wheel 118, the film is advanced by entering several code 105s followed by zeros to make sure the film advances properly. The canister cover is then installed. A cutting edge 105A is positioned in it just clockwise to the opening.

The camera door 17 is then closed with care being taken to engage the projecting ears of the take-up cover with the door spanner 167. A code 117 followed by zero is then entered, causing the film to advance nine frames.

The number of shots in the supply canister can then be entered. If the supply roll is full, the code 999 is entered. It will be translated in the camera to 1320, the quantity of film on a 200-foot roll. If a partial roll is loaded, the exact number of shots is entered (up to 998).

To change film when the camera is in operation, the number of shots remaining in the supply can is determined by entering code 121 followed by zero and reading the display.

The code 100 followed by zero is applied causing the film to advance nine frames. When the film advance indicator 18A goes out, the door spanner knob 167 is rotated counter-clockwise until it stops rotating the take-up canister cover to cut the film 70 with cutting blade 105A and seal the opening on the take-up can. If any key other than "A" is depressed, the door lock 21 is released.

After the door 17 is opened, any key other than "A" resets the lock. The take-up can 105 is removed and the film change procedure may then be employed. The "A" key will initiate a one-frame advance of film. The door is then closed and any key other than "A" pressed will advance nine frames of film to complete the film change.

CAMERA CONTROL SYSTEM

The camera control system operates under control of a keyboard 160 which may be mounted on the side of the camera 10 or may be remote from the camera and connected to the control electronics within the camera by a ribbon cable 161 as shown in FIG. 1. In the preferred embodiment shown, the keyboard is connected to the camera by an 8-foot long cable with 8 conductors. The keyboard, the display and the firing switch send and receive information in multiplexed form to the camera control.

As shown in FIG. 19G, the keyboard 160 has a crosswire switch assembly 161 which makes a connection between one of the four display strobes PB0, PB1, PB2 or PB3 and one of the display data conductors PB4, PB5, PB6 or PB7. The keyboard display bus, as seen in FIG. 19C, is connected to the output ports of the 8755 ROM.

In addition to the keyboard 160, inputs are provided to the control electronics by other means, including the on/off switch $S_1$, which is mounted on base unit 12. There is also a "door closed" sensor providing inputs to the control system, which provides its outputs in response to switch contacts carried by the door actuator 167 shown in FIG. 1 on the side of the case. The sensor does not sense whether the door is open or closed, but does change state to indicate that the operator desires to open the door, thereby initiating the "door open" subroutine.

The general operations performed by the control electronics are as follows. When the camera is turned on initially, it is necessary for the camera operator to identify himself by inputting his camera operator I.D., a three-digit code, on the keyboard. Once applied to the camera, the I.D. remains until the power is shut off. A second group of digits read into the random access memory are the day and date on which the pictures were taken. This information is not input manually. The camera control system has its own clock powered by a battery 168 mounted on the electronics circuit boards within the camera. The battery has long life of up to a year. The battery drives the 58167, a clock integrated circuit or IC. That IC is used to store camera usage information when the camera is powered down and is not operating and is also used to continuously record the day and date without regard to whether the camera is connected to a conventional power source.

The control electronics receives information concerning the operation of the camera from a number of sensors. The "door closed" sensor delivers its status information to terminal 33 of the central processor unit, as indicated above. A low voltage indicates the door is locked.

The "shutter open" sensor 122 is located behind aperture 126 on plate 107 as shown in FIG. 4. The shutter open sensor delivers its output signal through the transistor amplifier shown in FIG. 19A to terminal 31 of the central processor module as shown in FIGS. 19A and 19B. A high voltage at the CPU pin indicates that the shutter is open.

The sprocket hole sensor 123B for sensing the presence of the film sprocket holes is connected to pin 30 of the ROM memory module shown in FIG. 19C after passing through the field effect transistor amplifier shown in FIG. 19G. The voltage at the pin of the ROM is high when a hole has been found. The same sensor is used to indicate the camera is out of film by enabling it midway during the film advance subroutine when the sprocket hole is not between the source 123A and sensor 123.

Figure 19E:
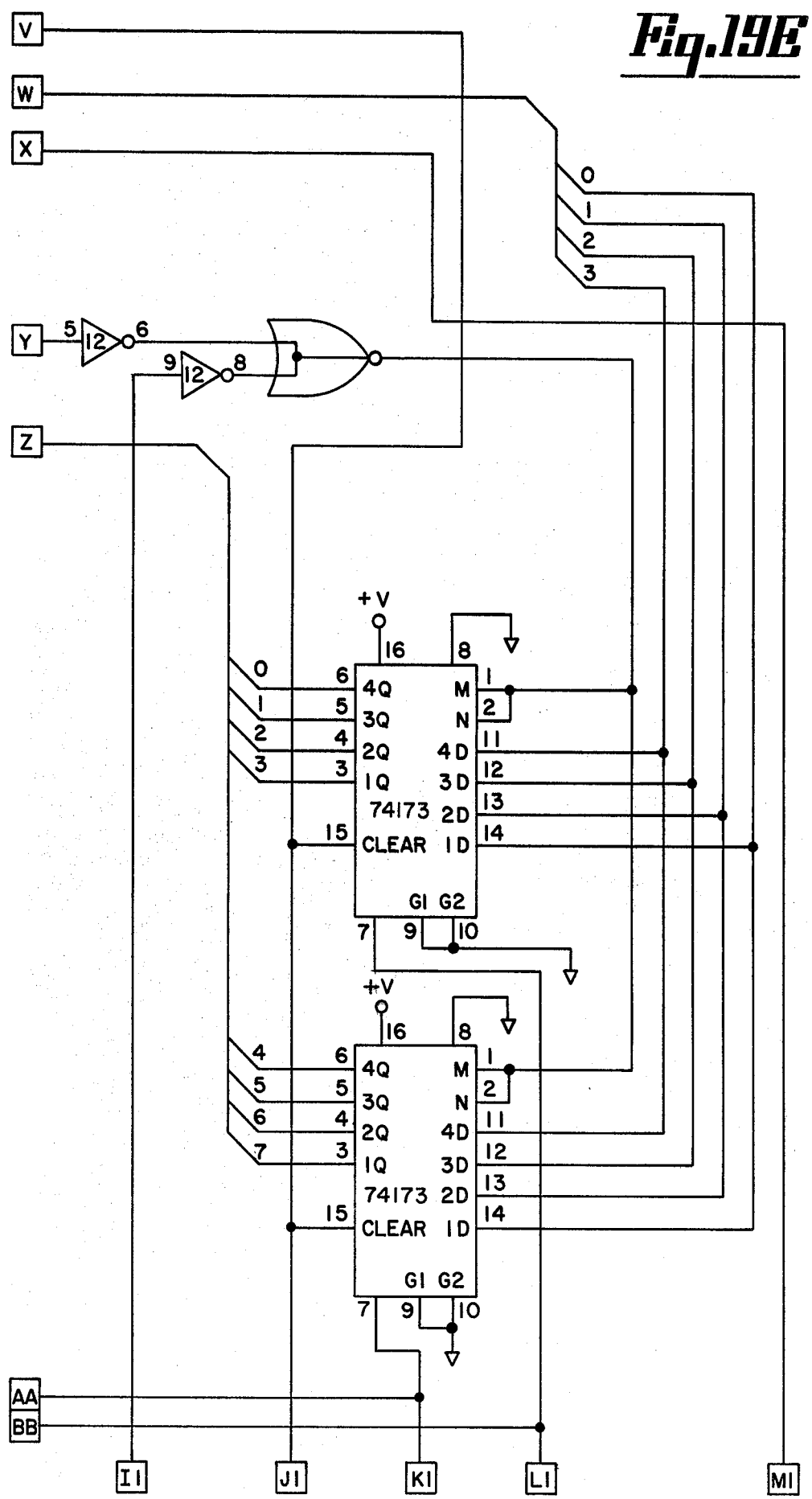
Figure 19F:
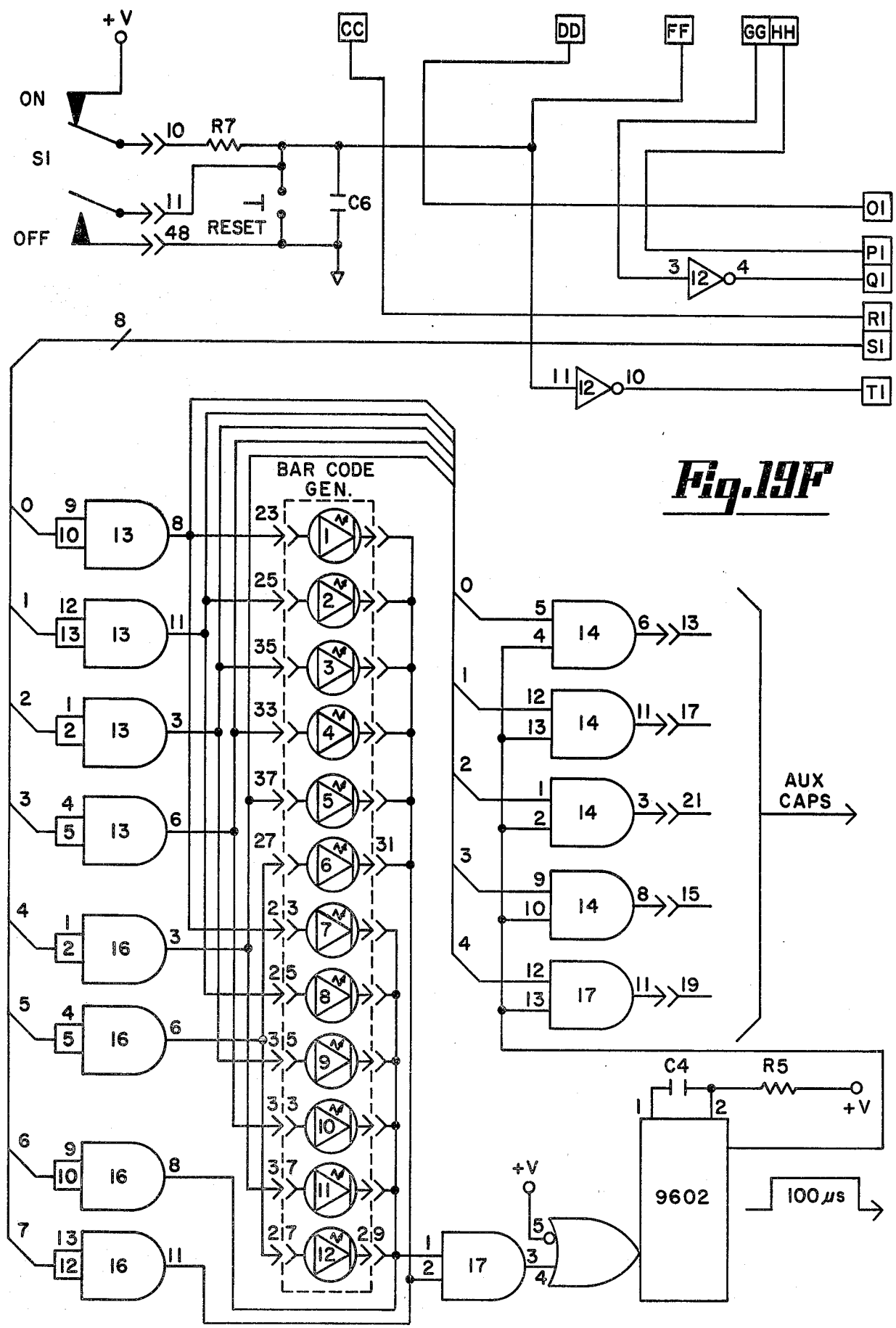
Figure 19H:
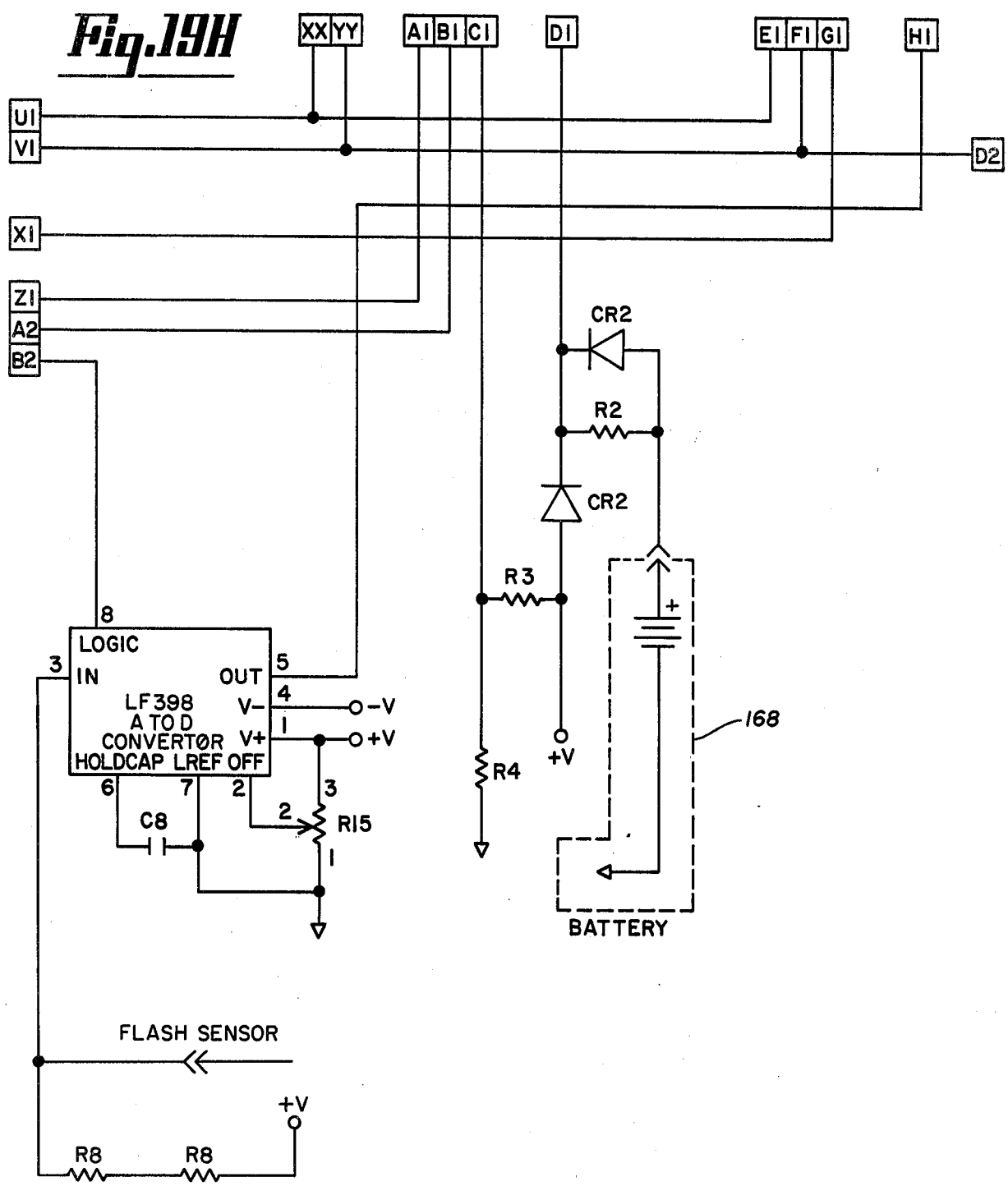
Figure 191:
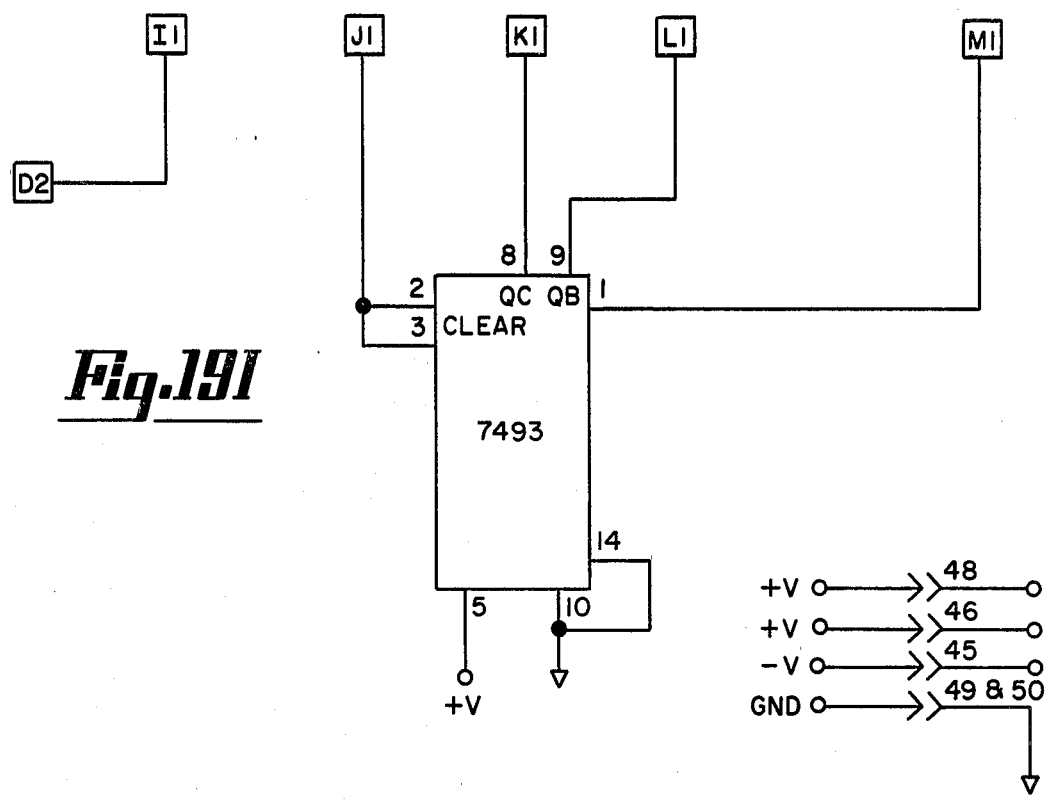
Figure 19J:
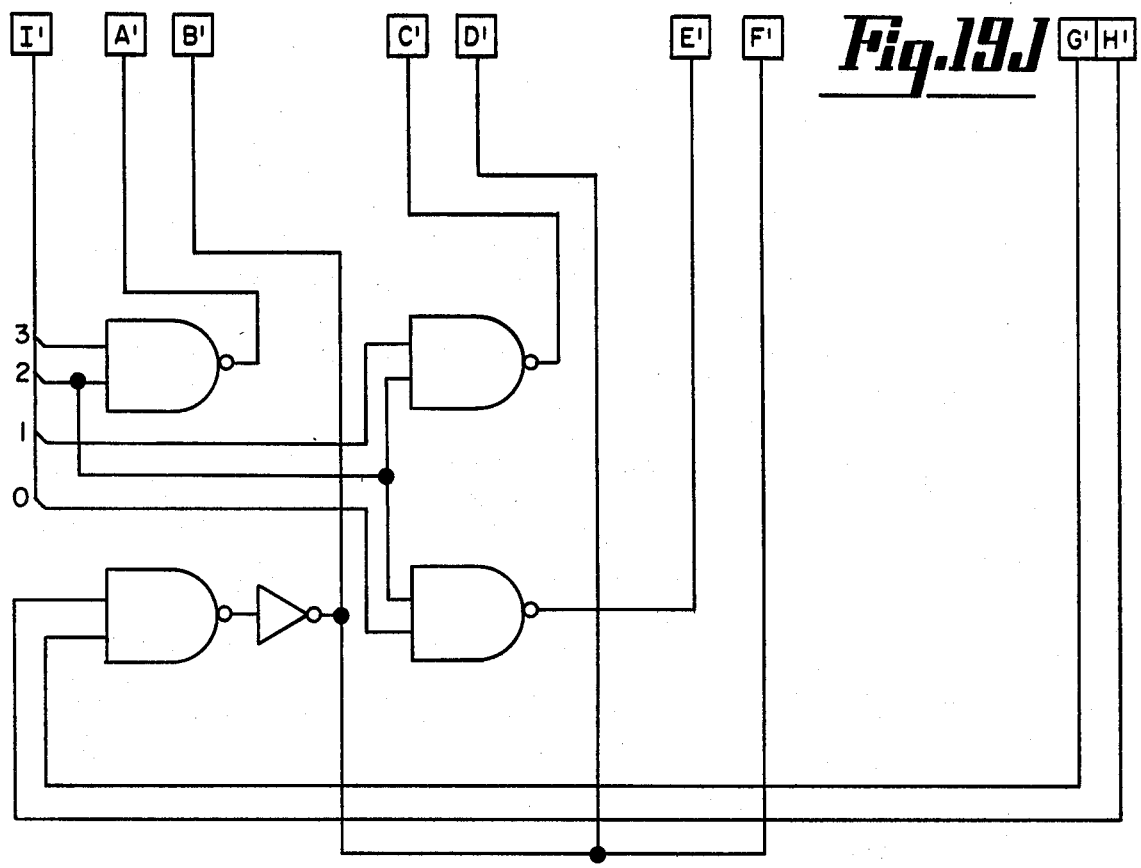

The flash sensor 69, which is mounted behind the viewing mirror 64 so as to receive light reaching mirror 64, has its signal coupled to the input of the analog to digital converter shown in FIG. 19H.

Information taken from coded cards by the circuit shown in FIG. 19B is coupled to the latch circuits shown in FIG. 19E. The card reader strobe senses whether the data card has been inserted and applies a high voltage to indicate presence of a card and the four data lines are connected to similar sensors which detect the presence or absence of black coding marks 20A at predetermined positions on the coding cards. The cards are used in the preferred embodiment to indicate the number and type of prints ordered by a photographic subject. As shown in FIG. 21, it may be seen that the coded spots on the card are positioned on both sides of the card so that either end of the card can be inserted into the reader, either face up or down, without detracting from the ability of the sensors to read the coded information. That information may then be applied to bar code track 115 opposite the portrait 109 of each subject. The order information can also be applied through the keyboard 160.

Similarly, the positioning of a "name on" card in the "name on" fixture 114 is indicated by a photo sensor applying a signal at pin 26 of the ROM as shown in FIG. 19C. The command to take a photo is given from the external control 160 by switch $S_2$ which is connected to pin 32 of the CPU. A high voltage at this pin indicates a request to take a picture.

The control circuit in FIGS. 19A through 19J also has a number of output functions. One of the output functions is the return connection for the sprocket hole sensing LED as shown in FIG. 19C at pin 31 of the CPU. This signal is high to energize LED 123A.

Another output function is the voltage applied to the door lock solenoid at the conclusion of the door opening subroutine. The door lock command generated by the circuitry shown in FIG. 19B is passed through the circuitry in FIG. 19A. A high signal at the CPU 127 terminal actuates the door solenoid and releases the door lock to open the camera.

A further output is the cancel bad shot LED pair 127 which illuminates a portion of the bar code track 115 as well as the center 109 of the film. "Cancel bad shot" is a subroutine initiated by the operator utilizing keyboard 160 to obliterate the film of a previous poor exposure. Obliteration of the bar code data provides a means whereby automatic processing equipment can avoid printing photographs known to be defective. A high voltage at CPU pin 35 indicates this function is active.

The control circuit also provides a stepper motor power enable output at the ROM output (active high) as well as a stepper motor pulse output at P10, pin 27 of the CPU. A rising edge indicates a drive pulse. Because the stepper motor expends more energy in the energized but not non-moving or unpulsed mode, steps are taken to only energize the stepper motor at portions of the camera operating regime when pulses are likely to be applied to the stepper motor. At the same time that the stepper motor is enabled, the film advance indicator is illuminated to allow the operator to monitor that function and wait until completion of film advance before calling for additional oeprations.

The shutter opening command is a further output of the control electronics at P11, pin 28 of the CPU, which is connected to the shutter solenoid mounted on the rear of the camera lens assembly to open the leaves of the shutter. This command is present when a high signal is at this port.

A still further output of the control electronics is the flash firing command at pin 37 of the CPU which initiates the flash cycle when the output voltage at that pin is a high level signal.

In view of the fact that a complete schematic of the logic circuitry is shown in FIGS. 19A through 19J, it is not believed to be necessary to describe each and every element in the control system. The programming for the system is indicated in the computer printout appendix attached hereto. In view of the complete schematic and programming information, it is believed necessary to provide only a brief further narrative explanation of the various subroutines which are carried out in the camera.

INITIALIZATION

When the camera is first turned on, it performs an initialization routine as set forth in lines 1450 through 1762 of the program. Several important operations are performed during the initialization subroutine. The initial step in the routine which requires operator intervention is the inputting of the operator's I.D. and the code assigned for the particular class being photographed. The operator's I.D. is punched in on the keyboard 161 after the display displays the code symbols EID to prompt the operator to enter his I.D. number. The I.D. characters are stored in RAM, and then the display prompts the operator with the code ECC to enter the class code, which is also stored in RAM. This information is then used for coding the bar code applied to the film and for running tabulations accessible to the photographer.

The initialize routine also clears the flag which indicates that over 25 shots have been taken in a particular class. A count is kept of the number of shots taken of a class of subjects and an annunciator warns the operator if the number exceeds the 25-shot limit.

The camera control system also obtains the number of shots of film left from the clock register and stores that number in RAM. The date stored in the clock is recalled and compared to the current date, and the updating of the day and date register in the clock is accomplished and the roll number is reset to 1. The film roll number is then read from the clock and written to the RAM and back to the clock. The date is converted to the bar code format and coded into the bar code RAM registers for use. The RAM locations storing the "pack" counts are all reset to zero, and the program returns to the main loop. The pack counts are a running tally of the number of each type of order that have been shot. It will be recalled that the order information was obtained either from order cards or the keyboard for each photo.

MAIN LOOP

As indicated at lines 195 to 249, the main loop first acts to ascertain that the photo command button $S_2$ has not been tripped, the order information stored in the registers is cleared and the film advance motor is turned off. The system then waits to receive keyboard information from control 160. It is the particular order information that is inputted in the keyboard during this subroutine. If the order information is in proper form, it is then stored under the routine to save keyboard input and store order information. Two separate orders can be stored for each particular subject or photograph.

The class code for the particular group being photographed is entered by the subroutine beginning with instruction 511. The class code is typed into the keyboard. After the class code is entered, the old counts stored concerning the number of packs ordered by a particular class is cleared out, as well as the number of frames in the particular class. The 25-shot flag is cleared to zero to begin counting the number of shots taken in the particular class. In order to enable the system to receive the class code, the command code 106 is placed on the keyboard prior to the class code number.

PICTURE TAKING

The picture taking routine commences at line 1908 of the program. The initial check is to determine whether the order information is being derived from drop cards being input into the card reading unit or whether the keyboard of control 160 is in use. This determination is made by reading the manual data entry flag to see whether it has been set. If cards are being used, the order information is read from the cards. This is accomplished by reading the output of the latches shown in FIG. 19E which receive the information when it is strobed from the card sensors.

The next operation in the picture taking routine is to strobe logic input at terminal 8 of the LF398 sample and hold chip in FIG. 19H to have its output become a digital representation of the room light received on the sensor 69 mounted on the rear of mirror 64. The room light is then compared to the room light value limit. An error signal is then generated if the measured room light exceeds the stored limit. It is necessary to have the room light below the upper limit in order for the automatic flash to properly operate to control the exposure.

If the room light is below the stored threshold, the open shutter command is generated at port 11 of the central processor as shown in FIG. 19B. The command is supplied to the solenoid 71 to open the shutter. The program then jumps to line 983 to generate a 3-millisecond delay. After the completion of the 3-millisecond delay, the program calls for the flash command at port 26. The sample and hold chip is strobed and the analog to digital converter is enabled and measures the detected light from the automatic flash. After completion of the analog to digital conversion, the value is read, inverted and saved. The analog to digital converter reads the flash level after a 190-microsecond delay. Based upon the comparison of the flash level measured to a table stored in memory, between 1 and 5 auxiliary capacitors are selected for firing to augment the amount of stored energy discharged through the flashtube. A discussion of the operation of the flash firing circuitry appears below under the heading Flash Control Circuitry.

After the flash firing routine has been completed, the program moves to step 1038 to verify that the shutter 72 has opened. This input is applied to port 14 of the central processor. If the shutter is open, the circuit waits for 15 milliseconds. If the shutter is closed at this point, an error message is displayed on the keyboard display. After the 15 millisecond delay, the shutter open sensor is checked again, and, if the shutter is stuck open, an error indication is displayed.

If the shutter is operating properly and has closed at this point, the number of photos taken in the room is compared to the 25-picture register and the display is flashed if more than 25 pictures have been taken in the same location. The flashing of the display does not disable the camera from taking additional pictures.

After shutter 72 has been confirmed closed, the routine jumps to the label routine at step 1989, which provides for the application of power to the stepper motor 120 to advance the film and the flashing of the bar code date on generator 117.

The power is applied to the stepper motor and the film is advanced in 18 separate 0.106124234-inch increments. Twenty pulses of 4-millisecond duration are needed to advance the film through each of the increments. In the preferred embodiment shown, the first three increments of 20 pulses are accomplished without the generation of bar codes, while the next 15 advances are each followed by a single bar code character, although it is not necessary to leave those spaces blank. The bar code data is based on 12 bits of data from RAM and is strobed onto the film in two parts for each increment. The LEDs for bits 1 through 6 are energized and then those for bits 7 through 12.

There is a 15-millisecond delay after each incremental advance of the film to allow the motor 120 to stop moving completely before the information is flashed on the film from the bar code generator 117. Power is then removed from the motor and, at the end of the film advance, the name under information is flashed by generator 114 when the LEDs 120 are energized to project the name under information on film track 113.

The first operation after the closing of the shutter is the enabling of power to the stepper motor by means of the output from pin 27 of the 8755A ROM. There is a 10-millisecond delay from the time of the enabling of the power to the stepper motor before the next step in the program. Three film advance increments are accomplished next by calling for pulses. The pointer R0 is set to the bar code data and the count for the number of film advances is set up. The bar code data is selected and delivered to the LED matrix in generator 117 and is thereby applied to the film. The bar code data is applied in two increments for 250-microsecond time intervals. After the bar code information is applied, the motor is pulsed and another 12 bits of bar code information is applied at each successive step.

When the film is in the middle of the movement between frames, the sprocket hole sensor LED 123A is momentarily enabled and the output of the associated sensor 123 is read. If light is transmitted from the LED 123A to its associated sensor 123 at this point in the operation sequence, it is an indication that the camera is out of film and an error indication OOF is then generated to inform the operator.

If LED 123A does not illuminate sensor 123 at this point, the program continues until reaching the last step in the film advance. When the last step is reached, only ten pulses are applied to the stepper motor, and sensor 123 is then enabled during the succeeding pulses to verify that the film has been properly advanced by detecting that the film sprocket hole appears between the LED and its associated sensor. If the sprocket hole has not yet been sensed, an additional number of pulses, not to exceed 20, is applied, one-by-one, ad the stepper motor power is then turned off. Thus, the film is advanced in an open loop configuration for the first 17 of the 18 incremental steps. After half of the pulses for the last step have been delivered, the hole sensor 123 is enabled and pulses are applied individually until the hole is properly sensed. Once the hole has been sensed, the "motor off" routine is enabled to remove power to the stepper motor 120. The final pulse applied to the motor has a reverse polarity to cause the stepper motor to come to rest in the proper position.

After is has been verified that the film is properly positioned, the program step 2052 verifies whether or not the "name on" information is to be added to the picture by checking the output of sensor 114A to see if the spot 112B on card 112 is present. If it is, a logic signal is detected at the card strobe location shown in FIG. 16A. The LEDs 120 in the name on device 114 are then energized to illuminate the name on card and place the written data on the film 70 adjacent the related image 109. The program then decrements the "frames remaining" count, storing it in the clock module in FIG. 19D. The program bumps the running tally for the number of packs ordered, clearing out the old order data and also bumps the number of frames shot. The program then advances to the main program and waits again for a closing of the firing command button.

In addition to the main photographic routine which includes the control of the flash, the control of the film advance, bar code generation and name under information assemblies, the camera also has a number of other routines utilized in connection with its normal operation. All of these routines are shown in the attached program material and briefly discussed below.

FLASH CONTROL CIRCUITRY

The camera system employs a novel flash control system utilizing the flash circuitry shown in FIG. 18, together with the control circuitry of FIG. 19. As shown in FIG. 20, the system employs a main flash unit F1, a fill light unit F2 and a backdrop light F3 which is located behind the subject to light a backdrop screen.

Those flashtubes and their associated firing circuitry are located in modules 201 through 203 in FIG. 18. Each module includes a conventional flashtube, a transformer T1 to couple the firing signal to the grid of the flashtube and a main energy storage capacitor C11 which stores the energy which creates the flash when the flashtube is energized by a signal being applied to its grid. In the preferred embodiment shown, the capacitors C11 for each of the flash units 201, 202 and 203 are 500 microfarad capacitors. For the reasons discussed below, the amount of flash illumination produced by discharging capacitor C11 through flashtube FT1 is below the amount needed to develop an adequate exposure under normal conditions.

Additional energy modules 205, 206, 207, 208 and 209 are provided for supplementing the energy stored in the main flash energy storage capacitors C11 with energy stored in capacitors such as C17 of module 205, a 170 microfarad capacitor. As discussed more completely below, these additional energy storage modules are used to supply additional energy to the various flashtubes during discharge to bring the total light emission up to an adequate level to take a proper photograph. The determination of the number of supplemental units to be used to supplement the energy in C11 is made by the control electronics.

During the picture taking routine, the light level on the subject is measured by the sensor 69 which provides an analog signal to the analog to digital converter which, in turn, provides a digital representation of the lighting level for use in the control circuitry of FIG. 19. After a predetermined time interval subsequent to the initiation of the main flash unit, the reflected light from the subject is measured by sensor 69 and the value compared to a table stored in the memory unit. Based upon the lighting level measured, the CPU then calls for from zero to five additional units 205, 206, 207, 208 or 209 to be fired to increase the amount of energy discharged in the arc in the flashtubes to increase the lighting level. Thus, the system utilizes an initial flash of known intensity to illuminate the subject, obtains a reflective signal indicative of the lightness or darkness of the subject and calls for the addition of supplemental capacitance to increase the amount of energy produced by the flashtube to adequately illuminate the subject to obtain a proper photographic image.

This flash control system differs substantially from known flash systems where an energy storage capacitor is utilized which has more than enough energy to provide adequate lighting for the subject, and additional means are provided to terminate the flashtube discharge, either by breaking the series connection between the energy storage capacitor in the flashtube or by providing a parallel shunt path for energy from the capacitor around the flashtube to quench its output. The system also differs substantially from prior art systems employing the discharge of a control flashtube to illuminate the subject, prior to opening the shutter, to obtain a sensor reading which is then utilized to preset the amount of energy to be delivered to a second flashtube which is subsequently fired. In that type of prior art system, the initial illumination of the subject which occurs prior to the opening of the shutter can cause a number of problems, including adverse reactions of the subject being photographed to the initial control flash to adversely affect the quality of the photograph ultimately taken. The system also requires use of a control flashtube and a main flashtube.

In the preferred embodiment shown, the main command to the flash is generated at FIG. 19B of the control circuitry at pin 37 of the central processor. That signal is used to illuminate a light emitting diode in the 4N26 module which, in turn, couples its light output to the phototransistor which is turned on when illuminated to actuate the primary winding of transformer T2 which, in turn, fires the main silicon controlled rectifier SCR1 to actuate the primary windings of the transformers, such as T1, in the three flash modules 201, 202 and 203 to fire the main flash units. The flash discharge in the flashtubes then begins, and, after a predetermined time as the flash approaches its full intensity, the reflected light from the subject is measured by the sensor 69 and the analog to digital converter. After the digital representation of the light reflected is compared to the tables, the circuit selects the appropriate number of auxiliary modules 205, 206, 207, 208 or 209 to be actuated and applies appropriate signals to the AND gates shown in the right-hand portion of FIG. 19F. When those gates are strobed with a 100 microsecond pulse from the 9602 module on FIG. 19F, positive pulses are produced at the appropriate inputs of the auxiliary modules. When a pulse is produced at the input to module 205, the LED is illuminated, turning on the phototransistor and turning on the Darlington transistor pair Q1, Q2 to actuate the primary winding of transformer T3, thereby firing SCR2 to couple the positive terminal of auxiliary capacitor C17 to the high voltage DC bus 210 to which the three main flashtubes are connected.

In order to vary the automatic flash characteristics, the sides of the auxiliary capacitors can be altered or the programming in the computer can be changed to call for different amounts of capacitance to be added in response to different detected levels of flash intensity.

What is claimed is:

1. A camera system comprising:
    (a) a camera body;
    (b) a film supply cartridge loaded with a supply of film and mounted within said camera body;
    (c) a film take-up cartridge mounted within said camera body constructed and arranged for receiving film from said film supply cartridge;
    (d) lens means mounted on said camera body for projecting an image from outside of said camera body on an exposure location within said camera body;
    (e) lens adjusting means for adjusting the magnification of said lens means;
    (f) shutter means mounted within said camera body constructed and arranged to permit said lens means to project an image on said exposure location only when said shutter means is opened;
    (g) film drive means for moving film from said film supply cartridge through said exposure location to said film take-up cartridge;
    (h) actuator means; and
    (i) control means for coordinating operation of said film drive means and said shutter means to sequentially expose said film on a frame-by-frame basis in response to said actuator means and for verifying that unexposed film is in said exposure location prior to opening said shutter means.

2. The system of claim 1 wherein said lens means includes zoom means for increasing the magnification of said lens without varying its focal length and wherein said lens adjusting means includes zoom drive means for varying the magnification of said lens means.

3. The invention of claim 1 wherein said control means includes a microprocessor.

4. The invention of claim 1 wherein said control means includes means for verifying proper operation of said shutter means.

5. The invention of claim 2 wherein said film take-up means includes cutting means coupled to said film access door for cutting off the film received within said cartridge from the film remaining in the film exposure location after said film is advanced before said film access door is opened.

6. The invention of claim 3 wherein said film cutoff means also includes means for selectively sealing said film access cartridge against entry of light after said film is cut off prior to opening said door.

7. A camera system comprising:
(a) a camera body including a film access door which includes lock means for actuation by an electrical signal and means for generating a logic signal;
(b) a film supply cartridge loaded with a supply of film and mounted within said camera body;
(c) a film take-up cartridge mounted within said camera body constructed and arranged for receiving film from said film supply cartridge;
(d) lens means mounted on said camera body for projecting an image from outside of said camera body on an exposure location within said camera body;
(e) lens adjusting means for adjusting the magnification of said lens means;
(f) shutter means mounted within said camera body constructed and arranged to permit said lens means to project an image on said exposure location only when said shutter means is opened;
(g) film drive means for moving film from said film supply cartridge through said exposure location to said film take-up cartridge;
(h) actuator means; and
(i) control means for coordinating operation of said film drive means and said shutter means to sequentially expose said film on a frame-by-frame basis in response to said actuator means, said control means also including means operatively coupled to said means for generating a logic signal to receive the logic signal therefrom for actuating said film drive means to move exposed film from said exposure location to said film take-up cartridge prior to generating the electrical signal for releasing said lock means to permit the opening of said film access door.

8. A camera system comprising:
(a) a camera body;
(b) a film supply cartridge loaded with a supply of film and mounted within said camera body;
(c) a film take-up cartridge mounted within said camera body constructed and arranged for receiving film from said film supply cartridge;
(d) lens means mounted on said camera body for projecting an image from outside of said camera body on an exposure location within said camera body;
(e) lens adjusting means for adjusting the magnification of said lens means wherein said lens adjusting means includes control stick means upon which a switch means is mounted for actuating said power means to extend and retract said extendable member, said control stick means also including means for adjusting said lens means in response to rotation of said control stick;
(f) shutter means mounted within said camera body constructed and arranged to permit said lens means to project an image on said exposure location only when said shutter means is opened;
(g) film drive means for moving film from said film supply cartridge through said exposure location to said film take-up cartridge;
(h) actuator means;
(i) control means for coordinating operation of said film drive means and said shutter means to sequentially expose said film on a frame-by-frame basis in response to said actuator means and for verifying that unexposed film is in said exposure location prior to opening said shutter means; and
(j) support means constructed and arranged for permitting said camera body to be detachably mounted thereon in an operative position, said support means comprising a base, an extendable member, one end of which is affixed to said base and the other end of which includes means for receiving said camera body, and power means for controllably extending and retracting said extendable member to raise and lower the camera system in response to said actuator means.

9. The system of claim 8 wherein said extendable member includes a rotatable threaded shaft connected to one end of said member, the other end of said member threaded to receive said threaded shaft to extend said member as said shaft is rotated.

10. The system of claim 8 wherein said power means includes means for limiting the maximum extension and retraction of said extendable member.

11. In a camera, including a shutter operated by an electrical signal to place an image on film, an operating system comprising:
(a) switch means for operator manipulation to initiate the taking of a photograph of a subject;
(b) display means;
(c) sensor means for measuring a camera operating parameter, said sensor means including means for sensing the presence of unexposed film in said camera; and
(d) control means operatively coupled to said switch means, said sensor means and said display means for verifying camera operating parameters within predetermined limits prior to providing an electrical signal for operating said shutter means and for causing said display means to display messages identifying the nature of any camera operating parameters outside of said predetermined limits and wherein said control means includes means responsive to said sensor for verifying presence of unexposed film.

12. The system of claim 11 wherein said sensor means senses whether or not said shutter means is closed and wherein said control means includes means for verifying that the shutter means is closed prior to manipulation of said switch means and means for verifying that said shutter means is opened after providing the electrical signal for opening said shutter means.

13. The invention of claim 12 wherein said input means includes keyboard means operatively coupled to said control means for transmitting data thereto when manipulated by an operator.

14. The invention of claim 12 wherein said input means includes card reading means operatively coupled to said control means for transmitting data thereto when a coded card is inserted therein.

15. The invention of claim 12 wherein said card reading means includes card sensing means for sensing whether or not a card has been placed therein and wherein said control means includes means responsive to said card sensing means to read data from said card.

16. A generator for converting a plurality of digital data words stored in a memory means into a longitudinally oriented bar code pattern on an elongated radiation sensitive medium, said generator comprising:
   radiation output port means mounted in an operative relation to said radiation sensitive medium for transmitting radiation therethrough to said radiation sensing medium to apply a longitudinally oriented bar code pattern thereto;
   a plurality of transducer means, each of which is coupled to a bit position of the portion of said memory means storing said data words for producing a radiation output detectable by said radiation sensitive medium when said bit position is in a first data state and for producing no detectable radiation output when said bit position is in a second data state;
   a plurality of coupling means, each of which is coupled at one end to one of said plurality of transducer means and at the other end to said radiation output port means, said coupling means being constructed and arranged for conducting the radiation output of each of said transducer means to a specific position in said radiation output port means for generating a first longitudinally oriented bar code word having a predetermined length on said radiation sensitive medium while said radiation sensitive medium is stationary; and
   means for longitudinally advancing said elongated radiation sensitive medium in incremental steps which have a length exceeding the predetermined length of the bar code words and including means for causing said memory means to change the data word delivered by said memory means to said transducer means to the next word in said plurality of data words.

17. The invention of claim 16 wherein said radiation sensitive medium is photographic film and wherein each of said plurality of transducer means comprises at least one light emitting diode means and wherein said coupling means comprises at least one fiber optics element coupled at one end to the light emitting portion of a light emitting diode.

18. The invention of claim 17 wherein the other end of each of the fiber optics coupling means has a rectangular cross-section with a length equal to the width of a bar in the bar code pattern and a width corresponding to the width of the minimum width bar in the bar code pattern.

19. The invention of claim 18 wherein drive means are provided for introducing relative movement between said radiation output port means and to radiation sensitive medium and wherein control means are provided for selecting different data words from said memory means for generating a succession of bar code patterns on said radiation sensitive medium.

20. In a camera, including a shutter operated by an electrical signal to place an image on film, an operating system comprising:
   (a) a switch means for operator manipulation to initiate the taking of the photograph of a subject;
   (b) flash means comprising a flashtube and a storage capacitor for storing a predetermined quantum of energy for discharge through the flashtube in response to a flash command;
   (c) sensor means for measuring the illumination of the subject;
   (d) control means operatively coupled to said switch means, said sensor means and said flash means for generating the electrical signal to open said shutter and to generate said flash command a predetermined time after application of the electrical signal to the shutter, said control means including means for comparing the output of said sensor means to a predetermined table and for generating a logic command indicative of the additional amount of flash output necessary to bring the illumination on the subject up to a predetermined value; and
   (e) at least one supplemental storage capacitor means coupled to said control means and said flash means for delivering additional energy to said flashtube in response to the logic command generated by said control means.

* * * * *

REEXAMINATION CERTIFICATE (1895th)
United States Patent [19]
Hopson

[11] B1 4,422,745
[45] Certificate Issued  Jan. 12, 1993

[54] CAMERA SYSTEM

[75] Inventor: Talmadge W. Hopson, Bloomington, Minn.

[73] Assignee: National School Studios, Inc., Minneapolis, Minn.

Reexamination Request:
No. 90/002,128, Sep. 10, 1990

Reexamination Certificate for:
Patent No.: 4,422,745
Issued: Dec. 27, 1983
Appl. No.: 288,815
Filed: Jul. 31, 1981

[51] Int. Cl.⁵ .............................................. G03B 17/24
[52] U.S. Cl. ................................... 354/105; 354/109; 354/173; 354/213; 354/293; 235/462
[58] Field of Search .................................. 354/105, 109

[56] References Cited

U.S. PATENT DOCUMENTS
4,150,882  4/1979  Konick ............................... 354/109

FOREIGN PATENT DOCUMENTS
51-68225  6/1976  Japan ................................ 103/243

*Primary Examiner*—Russell E. Adams, Jr.

[57] ABSTRACT

A microprocessor controlled camera system for exposing film with a photographic subject, a field of bar code data relevant to the subject and a field of data taken from a written card. The camera system includes an elevator assembly for raising and lowering the camera in response to a control actuator and a fixed aperture dual zoom lens system for framing the subject under control of the control actuator. A flash control system utilizes reflected light from the flashtube to indicate the amount of additional light needed on the subject and commands additional energy storage capacitors to be discharged through the flashtube to increase the subject illumination to a desired level.

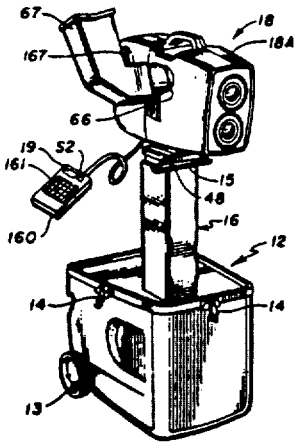

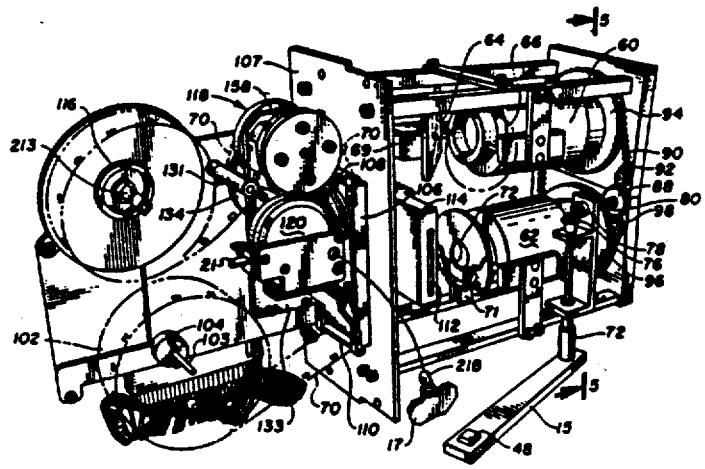

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 8, lines 56–68:
One fiber optic element of the generator 117 is shown in schematic form in FIG. 22. The [narrow] *round* end [118A] *119A* of the fiber optics element 119 is connected to receive the light output of its associated LED in the array shown in FIG. 19F of the control electronics. There is one such fiber optic element for each LED. Masking (not shown) is provided to prevent light from one LED to couple into the fiber optic element 119 associated with another LED. The other end 119B of each fiber optic element [118B] *119* has a length [1] *l* corresponding to the width of the 5 mm data track 115. The width of the end 119B is selected to correspond to the width of the narrowest bar code bar.

AS A RESULT OF REEXAMINATION, IT HAS BEEN DETERMINED THAT:

The patentability of claims 1–15 and 20 is confirmed.

Claims 16–19 are cancelled.

New claims 21–71 are added and determined to be patentable.

21. *The invention of claim 1, including:*
*memory means for storing a plurality of digital words;*
*radiation output port means mounted in an operative relation to the film for transmitting radiation therethrough to the film to apply a bar code pattern thereto;*
*a plurality of transducer means, each of which is coupled to a bit position of the portion of the memory means storing the data words for producing a radiation output detectable by the film when the bit position is in a first data state and for producing no detectable radiation output when the bit position is in a second data state;*
*a plurality of coupling means, each of which is coupled at one end to one of the plurality of transducer means and at the other end to the radiation output port means, the coupling means being constructed and arranged for conducting the radiation output of each of the transducer means to a specific position in the radiation output port means for generating a first bar code word having a predetermined length on the film while the film is stationary; and*
*means for longitudinally advancing the film in incremental steps which have a length exceeding the predetermined length of the bar code words and including means for causing the memory means to change the data word delivered by the memory means to the transducer means to the next word in the plurality of data words.*

22. *The system of claim 1 including a bar code generator operably coupled to the film for imaging a bar code on the film.*

23. *The system of claim 22 wherein the bar code generator comprises:*
*a radiation source for emitting radiation; and*
*means for producing the bar code pattern from the radiation and transferring the bar code to a plane of the film.*

24. *The system of claim 22 wherein the bar code contains information which relates to a customer order.*

25. *The system of claim 22 wherein the bar code contains information which relates to a class code for a particular classroom of students being photographed.*

26. *The system of claim 22 wherein the bar code contains information which relates to a calendar day in which a photograph is taken.*

27. *The system of claim 11 including a bar code generator operably coupled to the film for imaging a bar code on the film.*

28. *The system of claim 27 wherein the bar code generator comprises:*
*a radiation source for emitting radiation; and*
*means for producing the bar code pattern from the radiation and transferring the bar code to a plane of the film.*

29. *The system of claim 27 wherein the bar code contains information which relates to a customer order.*

30. *The system of claim 27 wherein the bar code contains information which relates to a class code for a particular classroom of students being photographed.*

31. *The system of claim 27 wherein the bar code contains information which relates to a calendar day on which a photograph is taken.*

32. *A portrait camera for photographing a subject to record a portrait of the subject on an elongated photographic film, the portrait camera comprising:*
*a camera body;*
*means for projecting an image of the subject onto a recording area of the film;*
*shutter means for controlling projection of the image from outside the camera body to the recording area of the film;*
*memory means for storing a plurality of data words, the memory means including a plurality of bit positions;*
*input means for receiving information related to the subject and storing the information as data words in the memory means;*
*radiation output port means mounted in an operative relation to the film for transmitting radiation therethrough to the film to apply a longitudinally oriented bar code pattern thereof;*
*a transducer array coupled to the plurality of bit positions of the memory means for producing a radiation output detectable by the film when a bit position of the memory means is in a first state and no detectable output when a bit position of the memory means is in a second state, the radiation output in the form of a bar code image which represents one of the data words stored in the memory means and which is in the form of light and dark bars of differing width;*
*a plurality of optical coupling means positioned between the transducer array and the radiation output port means, the plurality of optical coupling means being constructed and arranged for conducting the radiation output of the transducer array to the radiation* output port means so that the bar code image of the data word is imaged in a longitudinal orientation onto the film adjacent the recording area of the image of the subject while the film is stationary, so that the information related to the subject is transferred to the film and recorded in a form of a longitudinally oriented bar code representing the data word along side the image of a subject to which the data word is related;

means for longitudinally advancing the film in incremental steps which have a length exceeding the predetermined length of the bar code image which represents a data word;

control means for coordinating operation of the film drive means and the shutter means to sequentially expose the film on a frame-by-frame basis; and means, operably synchronized with the means for longitudinally advancing the film, for causing the memory means to change the data word delivered by the memoy means to the transducer array to a next word in the plurality of data words.

33. The invention of claim 32 wherein the information relates to a customer order for the subject and wherein the bar code image represents a data word indicative of the customer order.

34. The invention of claim 32 wherein the information relates to a class code for a particular classroom of students being photographed and wherein the bar code image represents a data word indicative of the class code.

35. The invention of claim 32 wherein the information relates to a calendar day on which a photograph is taken and wherein the bar code image represents a data word indicative of the calendar day.

36. The invention of claim 32 wherein the input means comprises a card reader for reading a code.

37. The invention of claim 32 wherein the input means comprises a keyboard for receiving a manual input.

38. A portrait camera comprising:

a camera body;

supply means for supplying an elongated radiation sensitive medium operably coupled to the camera body;

take-up means operably coupled to the camera body, constructed and arranged for receiving the elongated radiation sensitive medium from the supply means;

imaging means mounted on the camera body for projecting an image from outside the camera body to an exposure location within the camera body;

shutter means mounted within the camera body constructed and arranged to permit the imaging means to project an image on the exposure location only when the shutter means is open;

memory means for storing a plurality of data words;

input means for receiving input data from an operator and storing the input data in the memory means;

radiation output port means mounted in an operative relation to the radiation sensitive medium for transmitting radiation therethrough to the elongated radiation sensitive medium to apply a longitudinally oriented bar code pattern thereto;

a plurality of transducer means, each of which is coupled to a bit position of the portion of the memory means storing data words for producing a radiation output detectable by the elongated radiation sensitive medium when the bit position is in a first data state and for producing no detectable radiation output when the bit position is in a second data state;

a plurality of coupling means, each of which is optically coupled at one end to one of the plurality of transducer means at the other end to the radiation output port means, the plurality of coupling means being constructed and arranged for conducting the radiation output of each of the transducer means to a specific position in the radiation output port means for generating a first longitudinally oriented bar code word having a predetermined length on the elongated radiation sensitive medium while the elongated radiation sensitive medium is stationary;

means for longitudinally advancing the elongated radiation sensitive medium from the supply means through the exposure location and to the take-up means in incremental steps which have a length exceeding the predetermined length of the bar code words; and means for causing the memory means to change the data word delivered by the memory means to the transducer means to the next word in the plurality of data words whereby a plurality of multibit bar code words are recorded on the radiation sensing medium an entire bar code character at a time.

39. The invention of claim 38 wherein the plurality of coupling means comprises a plurality of fiber optic elements.

40. The invention of claim 38 wherein the elongated radiation sensitive medium is photographic film and wherein each of the plurality of transducer means comprises at least one light emitting diode means and wherein the coupling means comprises at least one fiber optics element coupled at one end to the light emitting portion of a light emitting diode.

41. The invention of claim 38 wherein the other end of each of the coupling means has a rectangular cross-section with a length equal to the width of a bar in the bar code pattern and a width corresponding to the width of the minimum width bar in the bar code pattern.

42. The invention of claim 38 wherein drive means are provided for introducing relative movement between the radiation output port means and radiation sensitive medium and wherein control means are provided for selecting different data words from the memory for generating a succession of bar code patterns on the radiation sensitive medium.

43. The invention of claim 38 wherein the input data is related to a subject in the image projected on the exposure location and the means for longitudinally advancing places the multibit bar code word adjacent a photographic image of the subject carried on the elongated radiation sensitive medium.

44. The invention of claim 43 wherein the multibit bar code word relates to a customer order for the subject.

45. The invention of claim 43 wherein the multibit bar code word relates to a class code for a particular classroom of students being photographed.

46. The invention of claim 43 wherein the multibit bar code word relates to a calendar day on which a photograph is taken.

47. The invention of claim 38 wherein the input means comprises a card reader for reading code.

48. The invention of claim 38 wherein the input means comprises a keyboard for receiving a manual input.

49. A portrait camera comprising:

a camera body;

supply means for supplying an elongated radiation sensitive medium operably coupled to the camera body;

take-up means operably coupled to the camera body, constructed and arranged for receiving the elongated radiation sensitive medium from the supply means;

imaging means mounted on the camera body for projecting an image from outside the camera body to an exposure location within the camera body;

shutter means mounted within the camera body constructed and arranged to permit the imaging means to project an image on the exposure location only when the shutter means is open;

memory means for storing a plurality of data words;

input means for receiving input data from an operator and storing the input data in the memory means;

radiation output port means mounted in an operative relation to the radiation sensitive medium for transmitting radiation therethrough to the elongated radiation sensitive medium to apply a longitudinally oriented bar code pattern thereto;

a plurality of transducer means, each of which is coupled to a bit position of a portion of the memory means storing data words for producing a radiation output detectable by the elongated radiation sensitive medium when the bit position is in a first data state and for producing no detectable radiation output when the bit position is in a second data state;

a plurality of coupling means, for transferring an image formed by the radiation output from the plurality of transducer means to the elongated radiation sensitive medium, the coupling means being optically coupled at one end to the plurality of transducer means and at the other end to the radiation output port means, and being constructed and arranged to conduct the radiation output of each of the transducer means to specific positions in the radiation output port means for generating a first longitudinally oriented bar code word having a predetermined length on the elongated radiation sensitive medium while the elongated radiation sensitive medium is stationary;

means for longitudinally advancing the elongated radiation sensitive medium from the supply means through the exposure location and to the take-up means in incremental steps have a length exceeding the predetermined length of the bar code words; and means for causing the memory means to change the data word delivered by the memory means to the transducer means to the next word in the plurality of data words whereby a plurality of multibit bar code words are recorded on the radiation sensing medium an entire bar code character at a time.

50. The portrait camera of claim 49 the plurality of coupling means comprises a plurality of fiber optic elements.

51. The portrait camera of claim 49 wherein the input data is related to a subject being photographed and wherein the control means causes bar code patterns to be placed adjacent frames of the elongated photographic film which contain photographic images of the subject.

52. The portrait camera of claim 51 wherein the bar code pattern relates to a customer order for the subject.

53. The portrait camera of claim 51 wherein the bar code pattern relates to a class code for a particular classroom of students being photographed.

54. The portrait camera of claim 51 wherein the bar code pattern relates to a calendar day on which a photograph is taken.

55. The portrait camera of claim 49 wherein the input means comprises a card reader for reading code.

56. The portrait camera of claim 49 wherein the input means comprises a keyboard for receiving a manual input.

57. A portrait camera comprising:

a camera body;

supply means for supplying an elongated radiation sensitive medium operably coupled to the camera body;

take-up means operably coupled to the camera body, constructed and arranged for receiving the elongated radiation sensitive medium from the supply means;

imaging means mounted on the camera body for projecting an image from outside the camera body to an exposure location within the camera body;

shutter means mounted within the camera body constructed and arranged to permit the imaging means to project an image on the exposure location only when the shutter means is open;

memory means for storing a plurality of data words;

input means for receiving input data from an operator and storing the input data in the memory means;

radiation output port means mounted in an operative relation to the radiation sensitive medium for transmitting radiation therethrough to the elongated radiation sensitive medium to apply a longitudinally oriented bar code pattern thereto;

a plurality of transducer means, each of which is coupled to a bit position of the portion of the memory means storing data words for producing a radiation output detectable by the elongated radiation sensitive medium when the bit position is in a first data state and for producing no detectable radiation output when the bit position is in a second data state, the radiation output from the plurality of transducers forming an image comprising a plurality of light and dark regions representing a bar code word;

a plurality of optical coupling means for conveying the image from the plurality of transducers to the radiation sensitive medium, the coupling means being optically coupled at one end to the plurality of transducer means and at the other end to the radiation output port means, the coupling means being constructed and arranged for conducting the radiation output of each of the transducer means to a specific position in the radiation output port means for generating a first longitudinally oriented bar code word having a predetermined length on the elongated radiation sensitive medium while the elongated radiation sensitive medium is stationary;

means for longitudinally advancing the elongated radiation sensitive medium from the supply means through the exposure location and to the take-up means in incremental steps which have a length exceeding the predetermined length of the bar code words; and means for causing the memory means to change the data word delivered by the memory means to the transducer means to the next word in the plurality of data words whereby a plurality of multibit bar code words are recorded on the radiation sensing medium an entire bar code character at a time.

58. The portrait camera of claim 57 wherein the plurality of coupling means comprises a plurality of fiber optic elements.

59. The portrait camera of claim 57 wherein the input data is related to a subject being photographed and wherein the control means causes bar code patterns to be placed adjacent frames of the film which contain photographic images of the subject.

60. The portrait camera of claim 59 wherein the bar code pattern relates to a customer order for the subject.

61. The portrait camera of claim 59 wherein the bar code pattern relates to a class code for a particular classroom of students being photographed.

62. The portrait camera of claim 59 wherein the bar code pattern relates to a calendar day on which a photograph is taken.

63. The portrait camera of claim 57 wherein the input means comprises a card reader for reading code.

64. A portrait camera comprising:

a camera body;

supply means for supplying an elongated radiation sensitive medium operably coupled to the camera body;

take-up means operably coupled to the camera body, constructed and arranged for receiving the elongated radiation sensitive medium from the supply means;

imaging means mounted on the camera body for projecting an image from outside the camera body to an exposure location within the camera body;

shutter means mounted within the camera body constructed and arranged to permit the imaging means to project an image on the exposure location only when the shutter means is open;

memory means for storing a plurality of data words;

input means for receiving input data from an operator and storing the input data in the memory means;

radiation output port means mounted in an operative relation to the radiation sensitive medium for transmitting radiation therethrough to the elongated radiation sensitive medium to apply a longitudinally oriented bar code pattern thereto;

a plurality of transducer means, each of which is coupled to a bit position of the portion of the memory means storing data words for producing a radiation output detectable by the elongated radiation sensitive medium when the bit position is in a first data state and for producing no detectable radiation output when the bit position is in a second data state;

a plurality of optical elements for optically coupling at one end each of the plurality of transducer means to the radiation output port means at the other end, to conduct the radiation output of each of the plurality of transducer means to specific positions on the radiation output port means related to locations of each of the plurality of transducer means, and to generate a first longitudinally oriented bar code word having a predetermined length on the elongated radiation sensitive medium while the elongated radiation sensitive medium is stationary;

means for longitudinally advancing the elongated radiation sensitive medium from the supply means through the exposure location and to the take-up means in incremental steps which have a length exceeding the predetermined length of the bar code words; and means for causing the memory means to change the data word delivered by the memory means to the transducer means to the next word in the plurality of data words whereby a plurality of multibit bar code words are recorded on the radiation sensing medium an entire bar code character at a time.

65. The portrait camera of claim 64 the plurality of optical element comprises a plurality of fiber optic elements.

66. The portrait camera of claim 64 wherein the input data is related to a subject being photographed and wherein the control means causes bar code patterns to be placed adjacent frames of the elongated photographic film which contain photographic images of the subject.

67. The portrait camera of claim 66 wherein the bar code pattern relates to a customer order for the subject.

68. The portrait camera of claim 66 wherein the bar code pattern relates to a class code for a particular classroom of students being photographed.

69. The portrait camera of claim 66 wherein the bar code pattern relates to a calendar day on which a photograph is taken.

70. The portrait camera of claim 64 wherein the input means comprises a card reader for reading code.

71. The portrait camera of claim 64 wherein the input means comprises a keyboard for receiving a manual input

* * * * *